United States Patent
Fujisawa et al.

(10) Patent No.: US 6,314,099 B1
(45) Date of Patent: Nov. 6, 2001

(54) ADDRESS MATCH DETERMINING DEVICE, COMMUNICATION CONTROL SYSTEM, AND ADDRESS MATCH DETERMINING METHOD

(75) Inventors: Yukio Fujisawa; Kazutoshi Miyamoto, both of Hyogo (JP); Christoph Gottschalk, Alsdorf; Hans-Michael Loch, Ratingen, both of (DE)

(73) Assignee: Mitsubishi Electric System LSI Design Corporation, Hyogo (JP)

(*) Notice: Subject to any disclaimer, the term of this patent is extended or adjusted under 35 U.S.C. 154(b) by 0 days.

(21) Appl. No.: 09/146,044

(22) Filed: Sep. 2, 1998

(30) Foreign Application Priority Data

Nov. 28, 1997 (JP) .................................................. 9-329332

(51) Int. Cl.[7] ...................................................... H04L 12/56
(52) U.S. Cl. ............................ 370/392; 711/221; 709/238
(58) Field of Search .................................... 370/351, 389, 370/392, 393; 707/1; 709/238–242; 711/1, 3, 216, 221

(56) References Cited

U.S. PATENT DOCUMENTS

| | | |
|---|---|---|
| 5,663,922 | 9/1997 | Tailliet . |
| 6,052,683 * | 4/2000 | Irwin .......................................... 707/8 |
| 6,076,158 * | 6/2000 | Sites et al. ............................ 712/230 |
| 6,192,450 * | 2/2001 | Bauman et al. ..................... 711/135 |

FOREIGN PATENT DOCUMENTS

| | | |
|---|---|---|
| 0 619 667 A1 | 10/1994 | (EP) . |
| 0 703 584 A1 | 3/1996 | (EP) . |
| 1-103341 | 4/1989 | (JP) . |
| 4-352534 | 12/1992 | (JP) . |
| 7-95234 | 4/1995 | (JP) . |

* cited by examiner

Primary Examiner—David R. Vincent
(74) Attorney, Agent, or Firm—Burns, Doane, Swecker & Mathis, LLP

(57) ABSTRACT

An address match determining device has an address filter memory (22) for storing a matrix or table having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N−m) bits of the corresponding address code. A received-address latch (21) extracts the high-order m bits and remaining low-order (N−m) bits from an address code latched thereinto. The device searches through the table for one 1-bit address match determination data specified by the first index composed of the extracted high-order m bits and the second index composed of the extracted low-order (N−m) bits, and then determines whether or not the latched address is available on the basis of the 1-bit address match determination data searched for.

19 Claims, 33 Drawing Sheets

FIG.2

HIGH ORDER BITS A10 TO A3
(Y COORDINATE DATA OF ADDRESS)

| | D0 | D1 | D2 | D3 | D4 | D5 | D6 | D7 |
|---|---|---|---|---|---|---|---|---|
| FFH | 0 | 0 | 0 | 0 | 0 | 0 | 0 | 0 |
| FEH | 0 | 0 | 0 | 1 | 1 | 0 | 0 | 0 |

$256 \times 8 = 2048$ BIT

| | D0 | D1 | D2 | D3 | D4 | D5 | D6 | D7 |
|---|---|---|---|---|---|---|---|---|
| 02H | 0 | 0 | 0 | 0 | 0 | 1 | 0 | 0 |
| 01H | 1 | 0 | 0 | 0 | 0 | 0 | 0 | 0 |
| 00H | 0 | 0 | 0 | 0 | 1 | 0 | 0 | 0 |

256 (rows)

0H 1H 2H 3H 4H 5H 6H 7H
8

LOW ORDER BITS A2 TO A0
(X COORDINATE DATA OF ADDRESS)

<AVAILABLE ADDRESSES>
004H, 010H, 025H, FE3H, FE4H

FIG.7

|  |  | THE NUMBER OF CYCLES | ROM SIZE (BYTE) |  |
|---|---|---|---|---|
| START: | LDA DET_AGR | 3 | 2 | ; READ THE CONTENTS OF THE OUTPUT BUFFER |
|  | BNE END | 2 | 2 | ; THE ADDRESS MATCH SIGNAL HAS BEEN FURNISHED ? |
|  | JSR ACTION |  |  | ; TRANSFER THE PACKET |
|  | RTS |  |  | ; COMPLETE THE ADDRESS MATCH DETERMINING PROCESS |
| END: | RTS |  |  | ; END |
|  | TOTAL | 5 CYCLES | 4 BYTE |  |

FIG. 10

|  |  | THE NUMBER OF CYCLES | ROM SIZE (BYTE) |  |
|---|---|---|---|---|
| START: LDX | Ym_REG | 3 | 2 | ; READ THE Y COORDINATE DATA OF THE LATCHED ADDRESS |
| LDA | ADR_TBL,X | 5 | 3 | ; REFER TO THE ADDRESS FILTER TABLE |
| STA | OUT_X_REG | 3 | 2 | ; WRITE A ROW OF EIGHT BITS D0 TO D7 INTO THE REGISTER 45 |
| LDA | DET_AGR | 3 | 2 | ; READ THE CONTENTS OF THE OUTPUT BUFFER |
| BNE | END | 2 | 2 | ; THE ADDRESS MATCH SIGNAL HAS BEEN FURNISHED ? |
| JSR | ACTION |  |  | ; TRANSFER THE PACKET |
| RTS |  |  |  | ; COMPLETE THE ADDRESS MATCH DETERMINING PROCESS |
| END: RTS |  |  |  | ; END |
|  | TOTAL | 16 CYCLES | 11 BYTE |  |

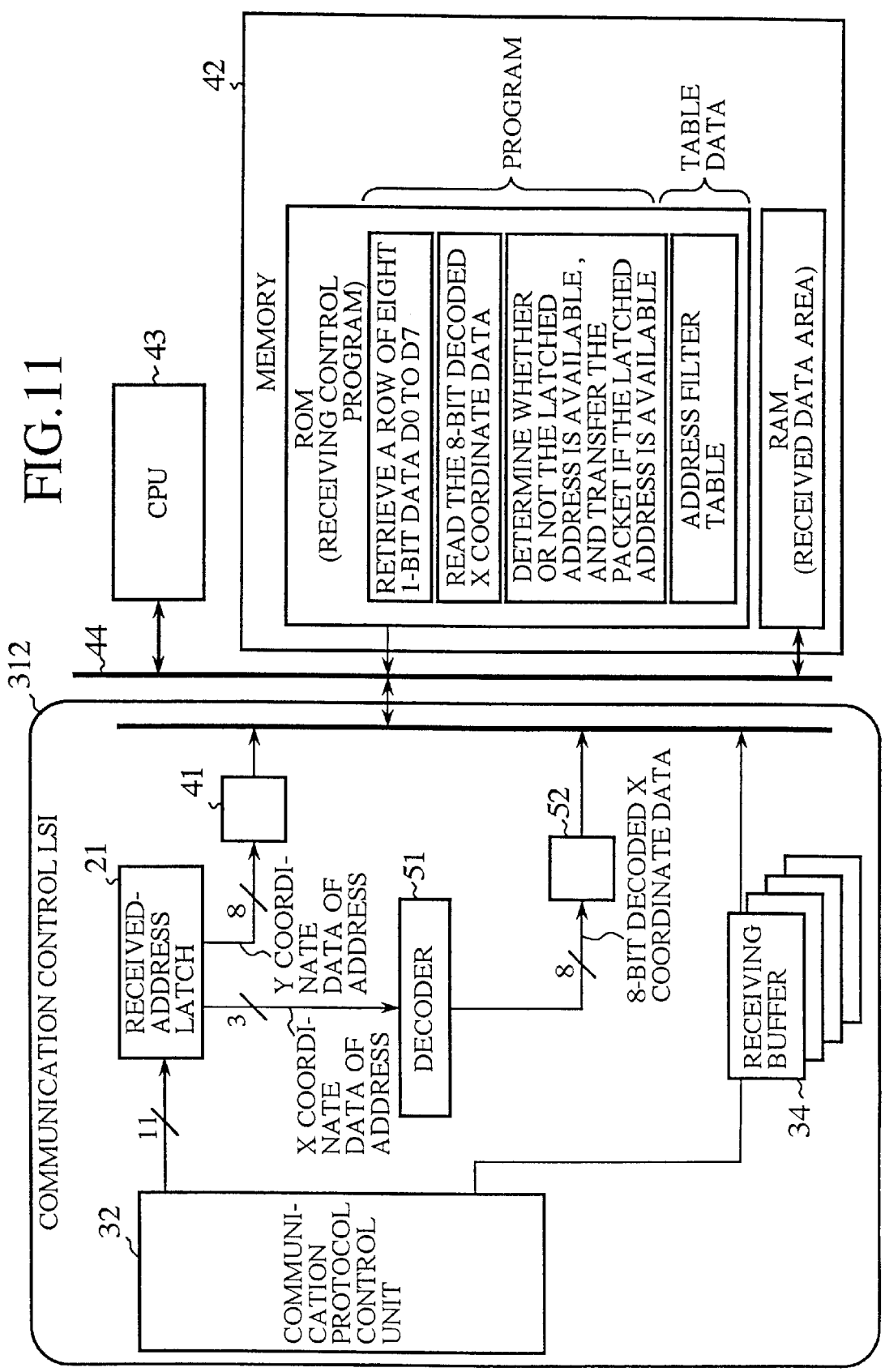

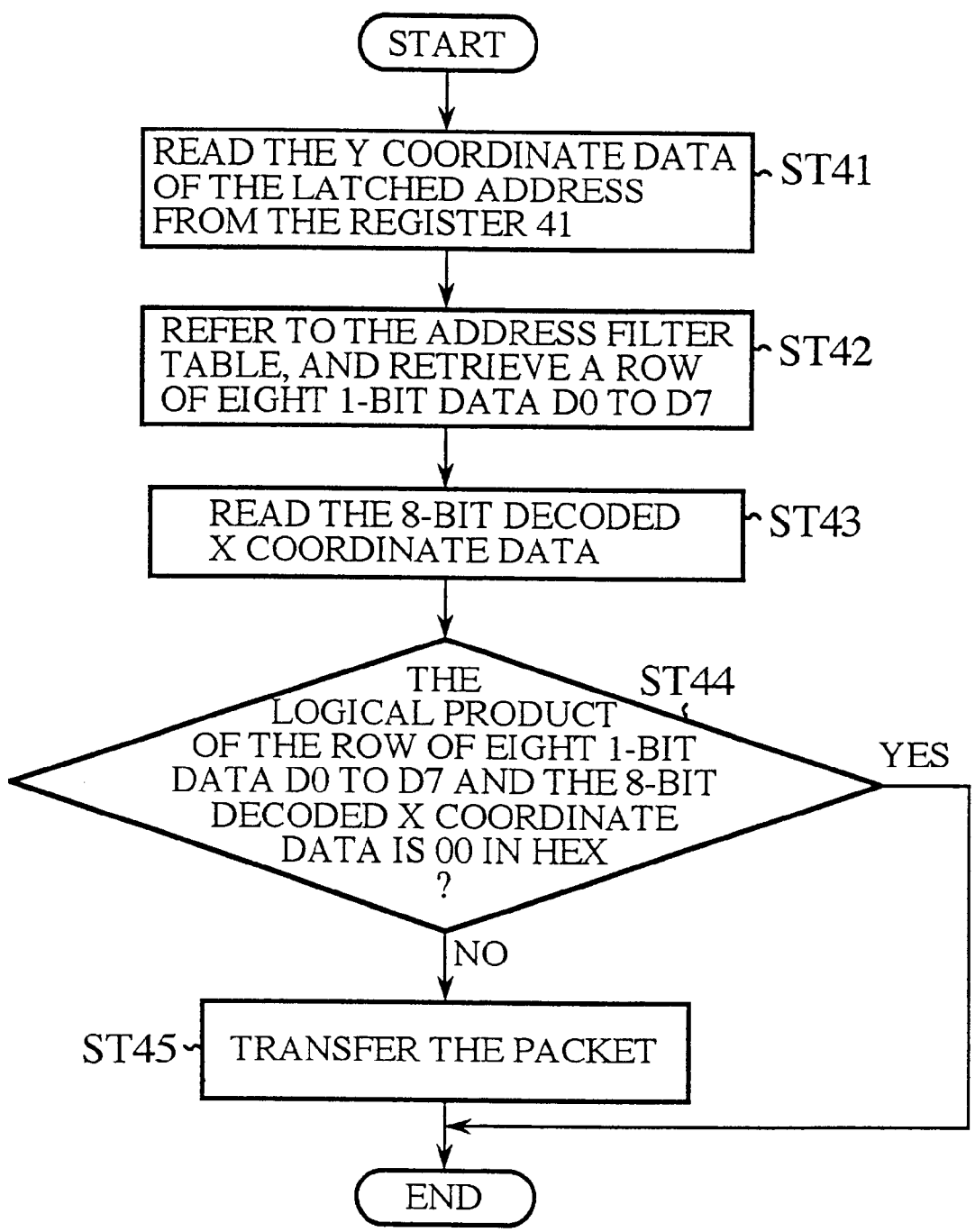

FIG.13

|  |  | THE NUMBER OF CYCLES | ROM SIZE (BYTE) |  |
|---|---|---|---|---|
| START: | LDX Ym_REG | 3 | 2 | ;READ THE Y COORDINATE DATA OF THE LATCHED ADDRESS |
|  | LDA ADR_TBL,X | 5 | 3 | ;REFER TO THE ADDRESS FILTER TABLE |
|  | AND X_SEL | 3 | 2 | ;READ THE LOGICAL PRODUCT OF THE ROW OF EIGHT 1-BIT DATA D0 TO D7 AND THE 8-BIT DECODED X COORDINATE DATA |
|  | BNE END | 2 | 2 | ;THE LOGICAL PRODUCT IS 0? |
|  | JSR ACTION |  |  | ;TRANSFER THE PACKET |
|  | RTS |  |  | ;COMPLETE THE ADDRESS MATCH DETERMINING PROCESS |
| END: | RTS |  |  | ;END |
|  | TOTAL | 13 CYCLES | 9 BYTE |  |

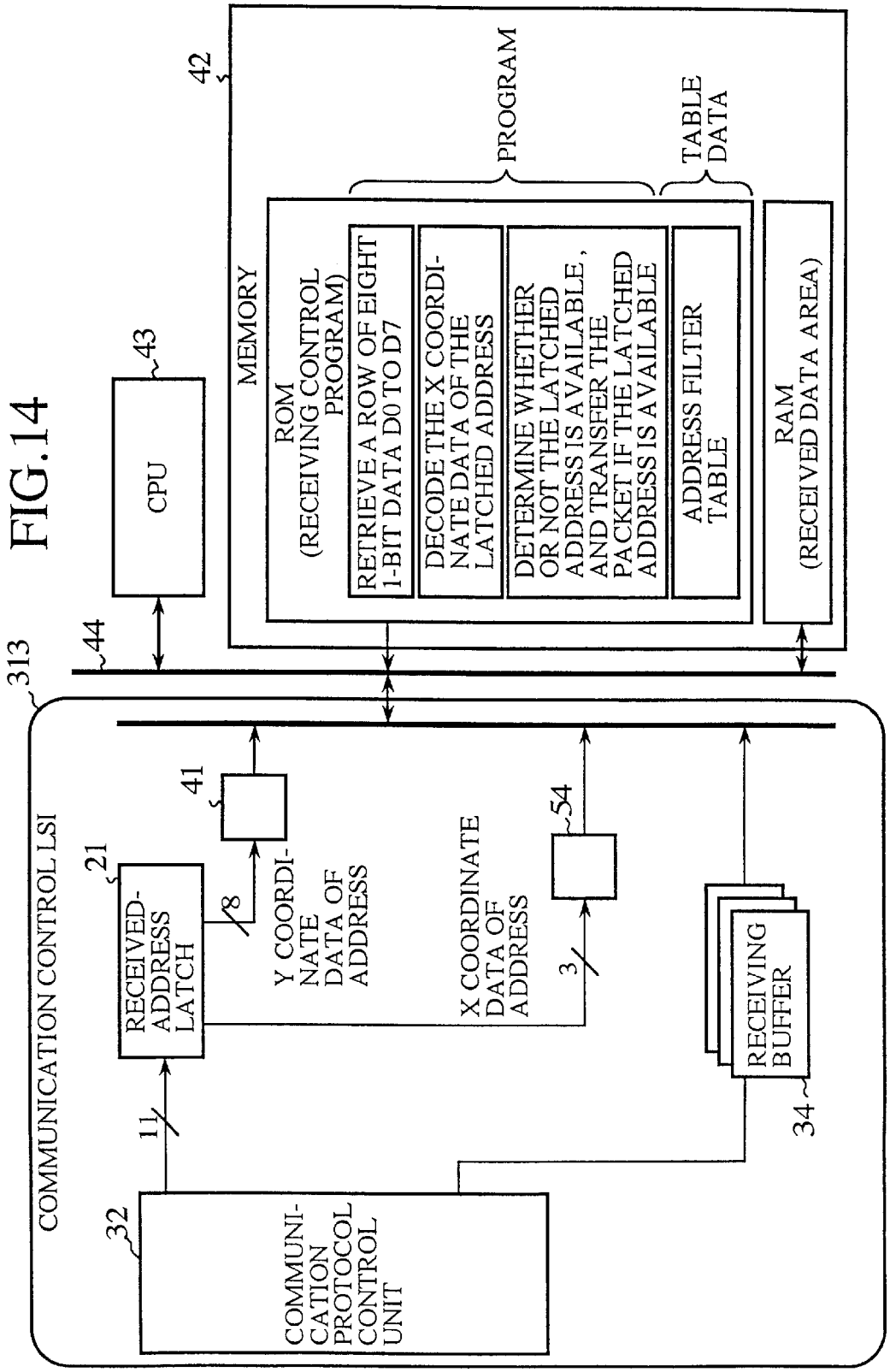

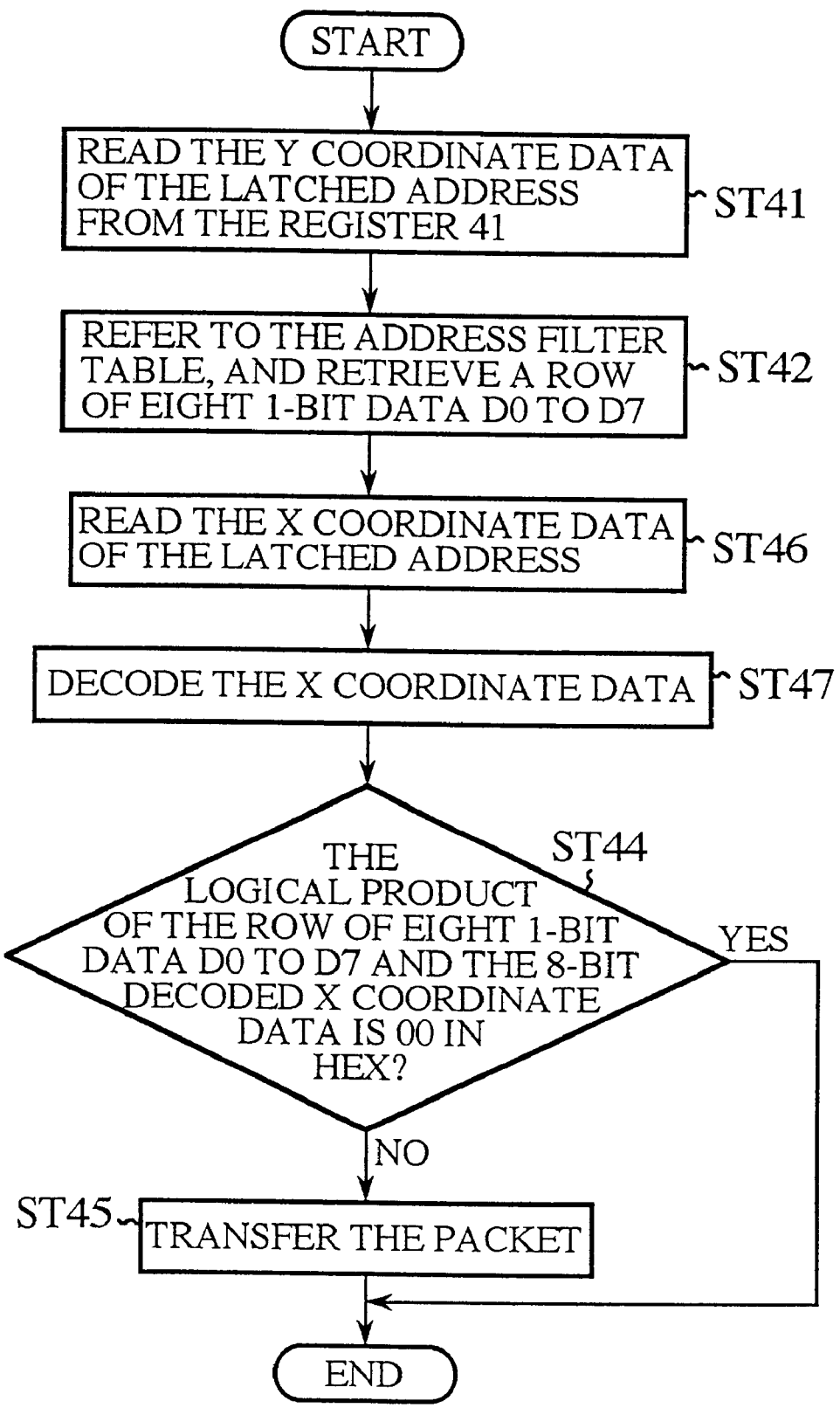

FIG.16

|  |  | THE NUMBER OF CYCLES | ROM SIZE (BYTE) |  |
|---|---|---|---|---|
| START: | LDX Ym_REG | 3 | 2 | ; READ THE Y COORDINATE DATA OF THE LATCHED ADDRESS |
|  | LDA ADR_TBL,X | 5 | 3 | ; REFER TO THE ADDRESS FILTER TABLE |
|  | STA X_DATA | 3 | 2 | ; WRITE A ROW OF EIGHT 1-BIT DATA D0 TO D7 |
|  | LDX Xn_RE | 3 | 2 | ; READ THE X COORDINATE DATA OF THE LATCHED ADDRESS |
|  | LDA DEC_TBL,X | 5 | 3 | ; REFER TO THE DECODE TABLE |
|  | AND X_DATA | 3 | 2 | ; CALCULATE THE LOGICAL PRODUCT |
|  | BNE END | 2 | 2 | ; THE LOGICAL PRODUCT IS 0 ? |
|  | JSR ACTION |  |  | ; TRANSFER THE PACKET |
|  | RTS |  |  | ; COMPLETE THE ADDRESS MATCH DETERMINING PROCESS |
| END: | RTS |  |  | ; END |
|  | TOTAL | 24 CYCLES | 16 BYTE |  |

FIG.19

|  |  | THE NUMBER OF CYCLES | ROM SIZE (BYTE) |  |
|---|---|---|---|---|
| START: LDA | BUF_ADR_H | 3 | 2 | ; READ THE HIGH-ORDER BITS OF THE ADDRESS |
| STA | ADR_H | 3 | 2 | ; WRITE THE HIGH-ORDER BITS INTO THE ADDRESS LATCH 21 |
| LDA | BUF_ADR_L | 3 | 2 | ; READ THE LOW-ORDER BITS OF THE ADDRESS |
| STA | ADR_DATA_L | 3 | 2 | ; WRITE THE LOW-ORDER BITS INTO THE ADDRESS LATCH 21 |
| LDA | DET_AGR | 3 | 2 | ; READ THE CONTENTS OF THE OUTPUT BUFFER |
| BNE | END | 2 | 2 | ; THE ADDRESS MATCH SIGNAL HAS BEEN FURNISHED ? |
| JSR | ACTION |  |  | ; TRANSFER THE PACKET |
| RTS |  |  |  | ; COMPLETE THE ADDRESS MATCH DETERMINING PROCESS |

END: RTS    ; END

TOTAL    17 CYCLES    12 BYTE

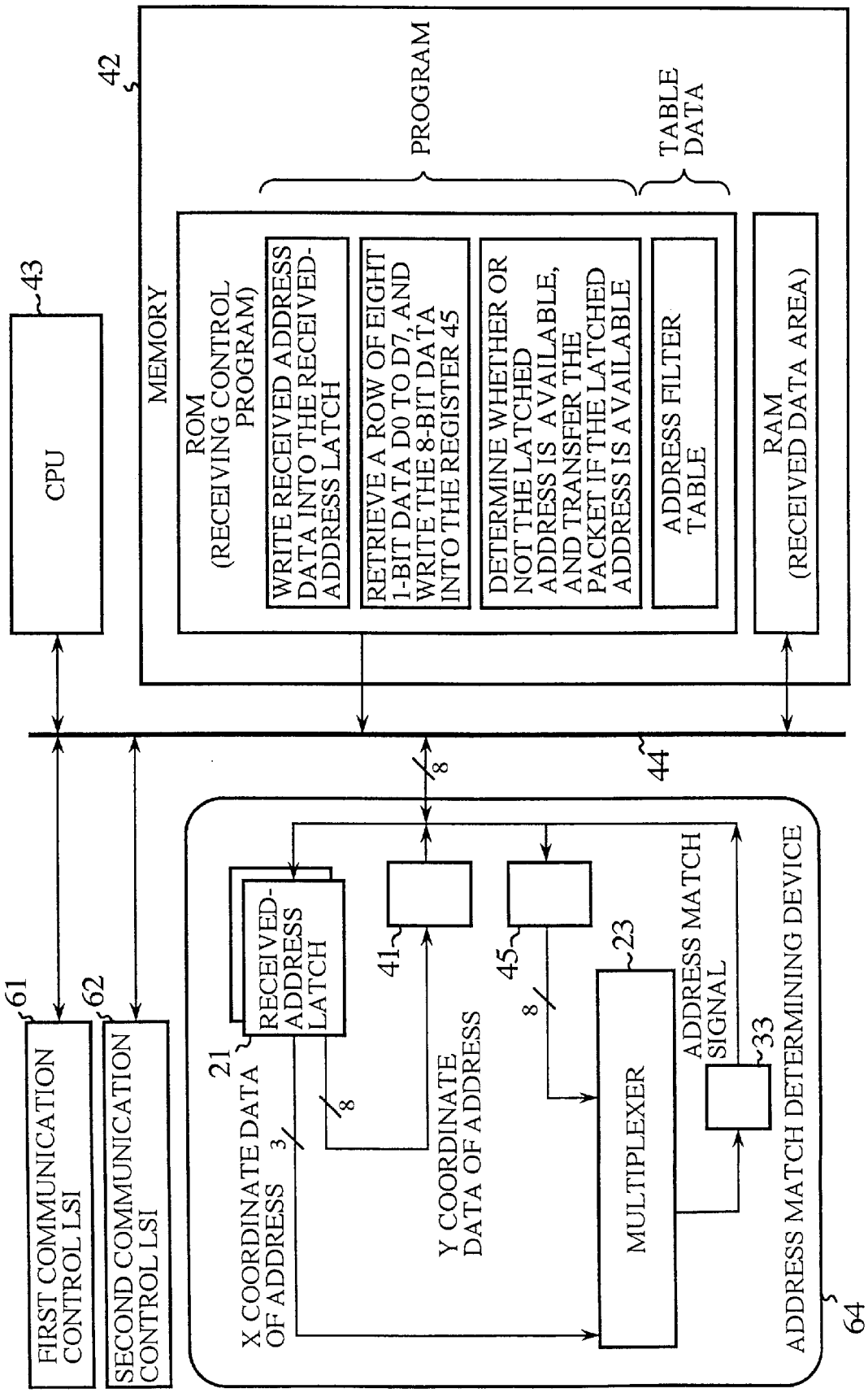

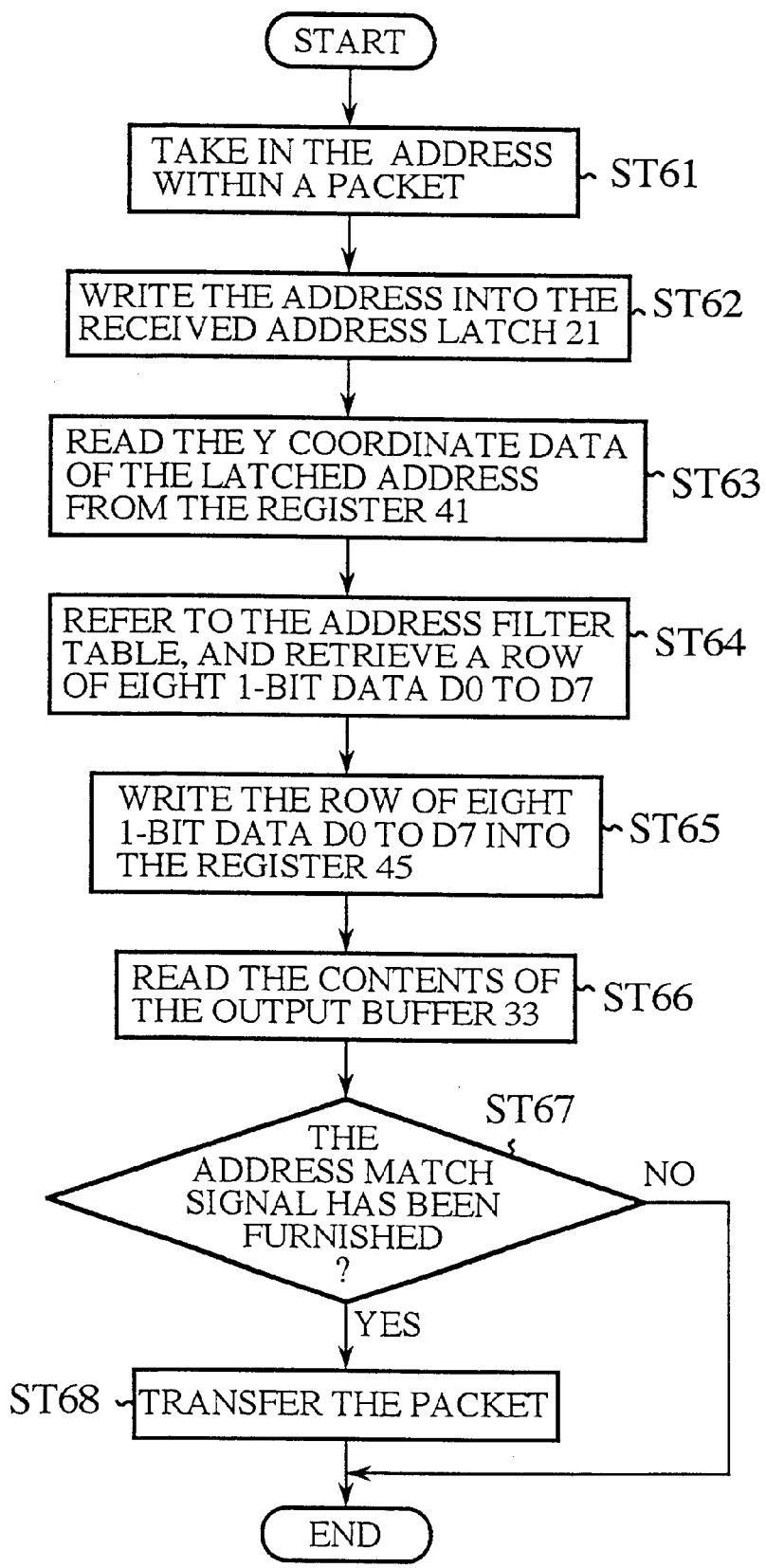

FIG.22

|  |  |  | THE NUMBER OF CYCLES | ROM SIZE (BYTE) |  |
|---|---|---|---|---|---|
| START: | LDA | BUF_ADR_H | 3 | 2 | ; READ THE HIGH-ORDER BITS OF THE ADDRESS |
|  | STA | ADR_H | 3 | 2 | ; WRITE THE HIGH-ORDER BITS INTO THE ADDRESS LATCH 21 |
|  | LDA | BUF_ADR_L | 3 | 2 | ; READ THE LOW-ORDER BITS OF THE ADDRESS |
|  | STA | ADR_DATA_L | 3 | 2 | ; WRITE THE LOW-ORDER BITS INTO THE ADDRESS LATCH 21 |
|  | LDX | Ym_REG | 3 | 2 | ; READ THE Y COORDINATE DATA OF THE LATCHED ADDRESS |
|  | LDA | ADR_TBL,X | 5 | 3 | ; REFER TO THE ADDRESS FILTER TABLE |
|  | STA | OUT_X_REG | 3 | 2 | ; WRITE A ROW OF EIGHT 1-BIT DATA D0 TO D7 INTO THE REGISTER 45 |
|  | LDA | DET_AGR | 3 | 2 | ; READ THE CONTENTS OF THE OUTPUT BUFFER |
|  | BNE | END | 2 | 2 | ; THE ADDRESS MATCH SIGNAL HAS BEEN FURNISHED ? |
|  | JSR | ACTION |  |  | ; TRANSFER THE PACKET |
|  | RTS |  |  |  | ; COMPLETE THE ADDRESS MATCH DETERMINING PROCESS |
| END: | RTS |  |  |  | ; END |
|  |  | TOTAL | 28 CYCLES | 19 BYTE |  |

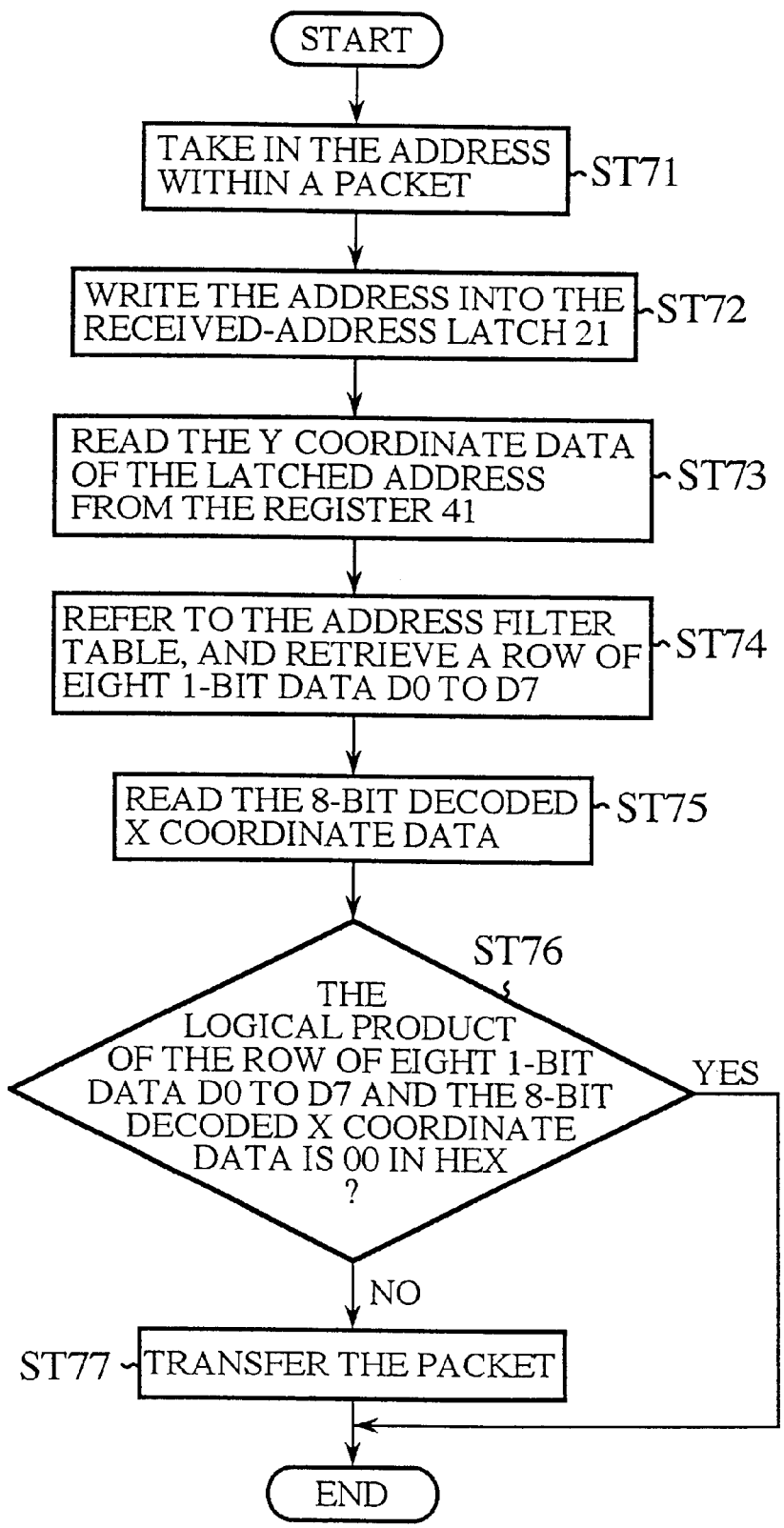

FIG.25

| | | THE NUMBER OF CYCLES | ROM SIZE (BYTE) | |
|---|---|---|---|---|
| START: LDA | BUF_ADR_H | 3 | 2 | ; READ THE HIGH-ORDER BITS OF THE ADDRESS |
| STA | ADR_H | 3 | 2 | ; WRITE THE HIGH-ORDER BITS INTO THE ADDRESS LATCH 21 |
| LDA | BUF_ADR_L | 3 | 2 | ; READ THE LOW-ORDER BITS OF THE ADDRESS |
| STA | ADR_DATA_L | 3 | 2 | ; WRITE THE LOW-ORDER BITS INTO THE ADDRESS LATCH 21 |
| LDX | Ym_REG | 3 | 2 | ; READ THE Y COORDINATE DATA OF THE LATCHED ADDRESS |
| LDA | ADR_TBL,X | 5 | 3 | ; REFER TO THE ADDRESS FILTER TABLE |
| AND | X_SEL | 3 | 2 | ; CALCULATE THE LOGICAL PRODUCT OF THE ROW OF EIGHT 1-BIT DATA D0 TO D7 AND THE 8-BIT DECODED X COORDINATE DATA |
| BNE | END | 2 | 2 | ; THE LOGICAL PRODUCT IS 0 ? |
| JSR | ACTION | | | ; TRANSFER THE PACKET |
| RTS | | | | ; COMPLETE THE ADDRESS MATCH DETERMINING PROCESS |
| END: RTS | | | | ; END |
| TOTAL | | 25 CYCLES | 17 BYTE | |

FIG.28

|  |  | THE NUMBER OF CYCLES | ROM SIZE (BYTE) |  |
|---|---|---|---|---|
| START: | LDA BUF_ADR_H | 3 | 2 | ; READ THE HIGH-ORDER BITS OF THE ADDRESS |
|  | STA ADR_H | 3 | 2 | ; WRITE THE HIGH-ORDER BITS INTO THE ADDRESS LATCH 21 |
|  | LDA BUF_ADR_L | 3 | 2 | ; READ THE LOW-ORDER BITS OF THE ADDRESS |
|  | STA ADR_DATA_L | 3 | 2 | ; WRITE THE LOW-ORDER BITS INTO THE ADDRESS LATCH 21 |
|  | LDX Ym_REG | 3 | 2 | ; READ THE Y COORDINATE DATA OF THE LATCHED ADDRESS |
|  | LDA ADR_TBL,X | 5 | 3 | ; REFER TO THE ADDRESS FILTER TABLE |
|  | STA X_DATA | 3 | 2 | ; WRITE A ROW OF EIGHT 1-BIT DATA D0 TO D7 |
|  | LDX Xn_RE | 3 | 2 | ; READ THE X COORDINATE DATA OF THE LATCHED ADDRESS |
|  | LDA DEC_TBL,X | 5 | 3 | ; REFER TO THE DECODE TABLE |
|  | AND X_DATA | 3 | 2 | ; CALCULATE THE LOGICAL PRODUCT |
|  | BNE END | 2 | 2 | ; THE LOGICAL PRODUCT IS 0 ? |
|  | JSR ACTION |  |  | ; TRANSFER THE PACKET |
|  | RTS |  |  | ; COMPLETE THE ADDRESS MATCH DETERMINING PROCESS |
| END: | RTS |  |  | ; END |
|  | TOTAL | 36 CYCLES | 24 BYTE |  |

FIG.30

|  |  |  | THE NUMBER OF CYCLES | ROM SIZE (BYTE) |  |
|---|---|---|---|---|---|
| START: | LDA | ADR_L | 3 | 2 | ; READ THE LOW-ORDER BITS OF THE LATCHED ADDRESS |
|  | AND | #07H | 2 | 2 | ; MASK (00000111B) |
|  | TAX |  | 1 | 1 | ; A→X |
|  | LDA | X_TBL,X | 5 | 3 | ; REFER TO THE X COORDINATE DATA TABLE |
|  | STA | X_DATA | 3 | 2 | ; WRITE THE X COORDINATE ADDRESS DATA |
|  | LDA | ADR_H | 3 | 2 | ; READ THE HIGH-ORDER BITS OF THE LATCHED ADDRESS |
|  | ASL | A | 1 | 1 | ; SHIFT TO LEFT |
|  | ASL | A | 1 | 1 | ; SHIFT TO LEFT |
|  | ASL | A | 1 | 1 | ; SHIFT TO LEFT |
|  | ASL | A | 1 | 1 | ; SHIFT TO LEFT |
|  | ASL | A | 1 | 1 | ; SHIFT TO LEFT |
|  | STA | ADR_H | 3 | 2 | ; READ THE HIGH-ORDER BITS OF THE LATCHED ADDRESS |
|  | LDA | ADR_L | 3 | 2 | ; READ THE LOW-ORDER BITS OF THE LATCHED ADDRESS |
|  | LSR | A | 1 | 1 | ; SHIFT TO RIGHT |
|  | LSR | A | 1 | 1 | ; SHIFT TO RIGHT |
|  | LSR | A | 1 | 1 | ; SHIFT TO RIGHT |
|  | ORA | ADR_H | 3 | 2 | ; (THE HIGH-ORDER BITS) OR (THE LOW-ORDER BITS) |
|  | TAX |  | 1 | 1 | ; A→X |
|  | LDA | Y_TBL,X | 5 | 3 | ; REFER TO THE ADDRESS FILTER TABLE |
|  | AND | X_DATA | 3 | 2 | ; CALCULATE THE LOGICAL PRODUCT |
|  | BEQ | END | 2 | 2 | ; THE LOGICAL PRODUCT IS 0 ? |
|  | JSR | ACTION |  |  | ; TRANSFER THE PACKET |
|  | RTS |  |  |  | ; COMPLETE THE ADDRESS MATCH DETERMINING PROCESS |
| END: | RTS |  |  |  | ; END |
|  | TOTAL |  | 45 CYCLES | 34 BYTE |  |

REGISTER MAP

| | ?* | ? | ? | ? | ? | ID10 | ID9 | ID8 |
|---|---|---|---|---|---|---|---|---|
| ADR_H (HIGH-ORDER BITS) | | | | | | | | |
| ADR_L (LOW-ORDER BITS) | ID7 | ID6 | ID5 | ID4 | ID3 | ID2 | ID1 | ID0 |

*:DON'T CARE

Y_TBL: .BYTE 01H  
.BYTE 05H  
.BYTE 04H  
.BYTE 00H  
.BYTE 07H  
.BYTE 01H ⎬ 256BYTE  
.BYTE 04H  
---- ----  
---- ----  
.BYTE 02H

X_TBL: .BYTE 01H  
.BYTE 02H  
.BYTE 04H  
.BYTE 08H  
.BYTE 10H ⎬ 8BYTE  
.BYTE 20H  
.BYTE 40H  
.BYTE 80H

FIG.34 (PRIOR ART)

|  |  |  | THE NUMBER OF CYCLES | ROM SIZE (BYTE) |  |
|---|---|---|---|---|---|
| START: | LDA | ADR_H | 3 | 2 | ; READ THE HIGH-ORDER BITS OF THE LATCHED ADDRESS |
|  | LDX | ADR_L | 3 | 2 | ; READ THE LOW-ORDER BITS OF THE LATCHED ADDRESS |
| SLOT1: | CMP | ADR_H_TBL | 2 | 2 | ; THE HIGH-ORDER BITS MATCH WITH THOSE OF AN AVAILABLE ADDRESS ? |
|  | BNE | SLOT2 | 2 | 2 | ; DETERMINATION |
|  | CPX | ADR_L_TBL | 2 | 2 | ; THE LOW-ORDER BITS MATCH WITH THOSE OF AN AVAILABLE ADDRESS ? |
|  | BNE | SLOT2 | 2/4 | 2 | ; DETERMINATION |
|  | JSR | ACTION |  |  | ; TRANSFER THE PACKET |
|  | RTS |  |  |  | ; COMPLETE THE ADDRESS MATCH DETERMINING PROCESS |
| SLOT2: | CMP | ADR_H_TBL+1 | 2 | 2 | ; THE HIGH-ORDER BITS MATCH WITH THOSE OF ANOTHER AVAILABLE ADDRESS ? |
|  | BNE | SLOT3 | 2 | 2 | ; DETERMINATION |
|  | CPX | ADR_L_TBL+1 | 2 | 2 | ; THE LOW-ORDER BITS MATCH WITH THOSE OF ANOTHER AVAILABLE ADDRESS ? |
|  | BNE | SLOT3 | 2/4 | 2 | ; DETERMINATION |
|  | JSR | ACTION |  |  | ; TRANSFER THE PACKET |
|  | RTS |  |  |  | ; COMPLETE THE ADDRESS MATCH DETERMINING PROCESS |
| SLOT3: | CMP | ADR_H_TBL+2 | 2 | 2 |  |
|  | BNE | SLOT4 | 2 | 2 |  |
|  | CPX | ADR_L_TBL+2 | 2 | 2 |  |
|  | BNE | SLOT4 | 2/4 | 2 |  |
|  | JSR | ACTION |  |  |  |
|  | RTS |  |  |  |  |
| ⋮ | ⋮ | ⋮ |  |  |  |
| SLOT256: | CMP | ADR_H_TBL+255 | 2 | 2 |  |
|  | BNE | END | 2 | 2 |  |
|  | CPX | ADR_L_TBL+255 | 2 | 2 |  |
|  | BNE | END | 2/4 | 2 |  |
|  | JSR | ACTION |  |  |  |
|  | RTS |  |  |  |  |
| END: | RTS |  |  |  | ; END |
|  | TOTAL |  | 2564 CYCLES | 2052 BYTE |  |

REGISTER MAP

| ADR_H (HIGH-ORDER BITS) | ?* | ? | ? | ? | ? | ID10 | ID9 | ID8 |
|---|---|---|---|---|---|---|---|---|
| ADR_L (LOW-ORDER BITS) | ID7 | ID6 | ID5 | ID4 | ID3 | ID2 | ID1 | ID0 |

*: DON'T CARE

```
ADR_H_TBL:  .EQU  00H ⎫               ADR_L_TBL:  .EQU  10H ⎫
            .EQU  01H ⎪                           .EQU  22H ⎪
            .EQU  04H ⎪                           .EQU  04H ⎪
            .EQU  00H ⎬ 256BYTE                   .EQU  A4H ⎬ 256BYTE
            .EQU  07H ⎪                           .EQU  F3H ⎪
            ----      ⎪                           ----      ⎪
            ----      ⎪                           ----      ⎪
            .EQU  02H ⎭                           .EQU  00H ⎭
```

ADDRESS MATCH DETERMINING DEVICE, COMMUNICATION CONTROL SYSTEM, AND ADDRESS MATCH DETERMINING METHOD

BACKGROUND OF THE INVENTION

1. Field of the Invention

The present invention relates to an address match determining device which can be incorporated into a communication control system such as a gateway or a control area network (CAN) in which each communication terminal can receive packets with different addresses, for determining whether or not the address code included in a packet is available, and to a communication control system including such an address match determining device. The invention also relates to a method of determining whether or not the address code included in a packet is available.

2. Description of the Prior Art

Referring now to FIG. 31, there is illustrated a block diagram showing the structure of a prior art communication control system. The communication control system includes a communication control LSI 1 for determining whether or not the address within a packet applied thereto match with available addresses of packets which are allowed to be transferred, a CPU 2 for controlling the communication control LSI 1, and a memory 3 for storing the packet to be transferred and the available addresses of packets which are allowed to be transferred.

Referring next to FIG. 32, there is illustrated a block diagram showing the detailed structure of the communication control LSI 1 of FIG. 31. The communication control LSI 1 comprises a received-address latch 4 for latching and temporarily storing the address code within a packet, a number of address-to-be-compared latches 5 for storing available addresses to be compared with the address stored in the received-address latch 4, a number of logical circuits 9 each for comparing the address stored in the received-address latch 4 with one available address stored in one address-to-be-compared latch 5, and an OR gate 13 which furnishes an address match signal when any one of the plurality of logical circuits 9 detects an address match.

In operation, when the communication control LSI 1 receives a packet, it extracts an address code from the packet and stores the address code into the received-address latch 4. On the other hand, the addresses of packets which are allowed to be transferred are prestored in the plurality of address-to-be-compared latches 5. In a communication system wherein there are 2048 possible addresses any one of which a packet to be transmitted via the transmission line have, if only 256 different addresses of them are available, 256 address-to-be-compared latches and 256 logical circuits are needed.

When the latched address code is temporarily stored in the received-address latch 4, each of the plurality of logical circuits 9 compares the latched address with one available address and then determines whether the latched address match with the available address. The OR gate 13 furnishes an address match signal to the CPU 2 when any one of the plurality of logical circuits 9 detects an address match. Otherwise, the OR gate 13 furnishes no address match signal. When the CPU 2 receives the address match signal from the OR gate 13 of the communication control LSI 1, it enables the communication control LSI 1 to transfer the packet to another communication device. In contrast, when the OR gate 13 furnishes no address match signal, the CPU 2 disables the packet transfer.

FIG. 33 shows a flow diagram showing an address comparison processing which is all carried out by the CPU 2 according to a software program. The amount of the address comparison processing is increased with an increase in the number of available addresses to be compared with the address latched into the received-address latch 4 (see the program list shown in FIG. 34), resulting in a greater burden of the address comparison processing put upon the CPU 2, which interferes with other processing such as the reception of packets. The number of available addresses to be compared with the address latched must be limited by a large margin.

A problem with the prior art communication control system which is so constructed is thus that a required number of address-to-be-compared latches and logical circuits, the number of which corresponds to the number of available addresses, must be provided, and therefore, if the number of available addresses any one of which each packet can have is relatively large, the size of the communication control LSI 1 is increased and the cost of the communication control LSI rises.

A second problem is that when it is required to change the number of available addresses, the communication control LSI 1 cannot support such the requirement and hence there is no alternative but to change the design of the communication control LSI 1.

Another problem is that the burden of the address comparison processing put upon the CPU 2 is increased in proportional to an increase in the number of available addresses to be compared with the address latched into the received-address latch, and therefore the speed with which the CPU can perform the address comparison processing is decreased exceedingly.

SUMMARY OF THE INVENTION

The present invention is made to overcome the above problems. It is therefore an object of the present invention to provide an address match determining device which can perform address comparing processing at a high speed without the need to increase its size even when the number of available addresses any one of which each packet that is allowed to be transferred can have is relatively large, and a communication control system including such an address match determining device.

It is another object of the present invention to provide a method capable of performing address comparing processing at a high speed.

In accordance with an aspect of the present invention, there is provided an address match determining device comprising: a storage unit for storing a matrix or table having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N−m) bits of the corresponding address code; an extract unit for receiving an N-bit address code included in a packet to be transmitted by way of a transmission line, and for extracting the high-order m bits and remaining low-order (N−m) bits from the address code received; and a search and determination unit for searching through the table stored in the storage unit for one 1-bit address match determination data specified by the first index composed of the extracted high-order m bits and the second index composed of the extracted low-order (N−m) bits, and for determining whether the 1-bit address match determination data searched for indicates that the received address code is available.

In accordance with a preferred embodiment of the present invention, the search and determination unit includes a retrieving unit for retrieving a row or column of plural 1-bit address match determination data which is specified by the first index composed of the extracted high-order m bits from the table stored in the storage unit, and a determination unit for determining whether one of the plural 1-bit address match determination data corresponding to the second index composed of the extracted low-order (N−m) bits indicates that the received address code is available.

Alternatively, the search and determination unit includes a retrieving unit for retrieving a row or column of plural 1-bit address match determination data which is specified by the second index composed of the extracted low-order (N−m) bits from the table stored in the storage unit, and a determination unit for determining whether one of the plural 1-bit address match determination data corresponding to the first index composed of the extracted high-order m bits indicates that the received address code is available.

In accordance with another aspect of the present invention, there is provided a communication control system comprising: a storage unit for storing a matrix having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N−m) bits of the corresponding address code; an extract unit for receiving an N-bit address code included in a packet to be transmitted by way of a transmission line, and for extracting the high-order m bits and remaining low-order (N−m) bits from the address code received; a search and determination unit for searching through the table stored in the storage unit for one 1-bit address match determination data specified by the first index composed of the extracted high-order m bits and the second index composed of the extracted low-order (N−m) bits, and for determining whether the 1-bit address match determination data searched for indicates that the received address code is available; and transfer unit for transferring the packet by way of the transmission line if the search and determination unit determines that the received address code is available. Preferably, the storage unit, the extract unit, and the search and determination unit are integrated into a communication control LSI.

In accordance with another preferred embodiment of the present invention, the search and determination unit includes a retrieving unit for retrieving a row or column of plural 1-bit address match determination data which is specified by the first index composed of the extracted high-order m bits from the table stored in the storage unit, and a determination unit for determining whether one of the plural 1-bit address match determination data corresponding to the second index composed of the extracted low-order (N−m) bits indicates that the received address code is available. Preferably, the extract unit and the determination unit are integrated into a communication control LSI, the retrieving unit and the transfer unit are implemented by a processing device electrically connected to the communication control LSI, and the storage unit is a memory electrically connected to both the communication control LSI and the processing device. The processing device can access the high-order m bits of the latched address extracted by the extract unit, access the memory so as to retrieve the row or column of plural 1-bit address match determination data, inform the determination unit of the row or column of plural 1-bit address match determination data, and enable the communication control LSI to transfer the packet if the determination unit of the communication control LSI determines that the received address code is available. Alternatively, at least the extract unit is integrated into a communication control LSI, the search and determination unit and the transfer unit are implemented by a processing device electrically connected to the communication control LSI, and the storage unit is a memory electrically connected to both the communication control LSI and the processing device. The processing device can access the high-order m bits of the latched address extracted by the extract unit, access the memory so as to retrieve the row or column of plural 1-bit address match determination data, determine whether or not the latched address is available on the basis of the row or column of plural 1-bit address match determination data and the low-order (N−m) bits of the latched address, and enable the communication control LSI to transfer the packet if the processing device determines that the received address code is available.

In accordance with another preferred embodiment of the present invention, the search and determination unit includes a retrieving unit for retrieving a row or column of plural 1-bit address match determination data which is specified by the second index composed of the extracted low-order (N−m) bits from the table stored in the storage unit, and a determination unit for determining whether one of the plural 1-bit address match determination data corresponding to the first index composed of the extracted high-order m bits indicates that the received address code is available. Preferably, the extract unit and the determination unit are integrated into a communication control LSI, the retrieving unit and the transfer unit are implemented by a processing device electrically connected to the communication control LSI, and the storage unit is a memory electrically connected to both the communication control LSI and the processing device. The processing device can access the low-order (N−m) bits of the latched address extracted by the extract unit, access the memory so as to retrieve the row or column of plural 1-bit address match determination data, inform the determination unit of the row or column of plural 1-bit address match determination data, and enable the communication control LSI to transfer the packet if the determination unit of the communication control LSI determines that the received address code is available. Alternatively, at least the extract unit is integrated into a communication control LSI, the search and determination unit and the transfer unit are implemented by a processing device electrically connected to the communication control LSI, and the storage unit is a memory electrically connected to both the communication control LSI and the processing device. The processing device can access the low-order (N−m) bits of the latched address extracted by the extract unit, access the memory so as to retrieve the row or column of plural 1-bit address match determination data, determine whether or not the latched address is available on the basis of the row or column of plural 1-bit address match determination data and the high-order m bits of the latched address extracted by the extract unit, and enable the communication control LSI to transfer the packet if the processing device determines that the received address code is available.

In accordance with another preferred embodiment of the present invention, the storage unit, the extract unit, and the search and determination unit are incorporated into an address match determining device, and at least two communication control LSIs are electrically connected to the address match determining device by way of a data bus. The address match determining device can receive the address code within a packet to be transferred from one of the communication control LSIs to the other one by way of the data bus, and the transfer unit can transfer the packet to the other communication control LSI by way of the data bus if the search and determination unit of the address match determining device determines that the latched address is available.

In accordance with another preferred embodiment of the present invention, the extract unit and the determination unit are incorporated into an address match determining device, at least two communication control LSIs are electrically connected to the address match determining device by way of a data bus, the retrieving unit and the transfer unit are implemented by a processing device electrically connected to the two communication control LSIs by way of the data bus, and the storage unit is a memory electrically connected to both the communication control LSIs and the processing device by way of the data bus. The processing device can latch an address code within a packet to be transferred from one of the two communication control LSIs to the other one and inform the address match determining device of the latched address, access the high-order m bits of the latched address extracted by the extract unit of the address match determining device, access the memory so as to retrieve the row or column of plural 1-bit address match determination data, inform the determination unit of the address match determining device of the row or column of plural 1-bit address match determination data, and transfer the packet to the other communication control LSI if the determination unit of the address match determining device determines that the latched address is available.

In accordance with another preferred embodiment of the present invention, the extract unit and the determination unit are incorporated into an address match determining device, at least two communication control LSIs are electrically connected to the address match determining device by way of a data bus, the retrieving unit and the transfer unit are implemented by a processing device electrically connected to the two communication control LSIs by way of the data bus, and the storage unit is a memory electrically connected to both the communication control LSIs and the processing device by way of the data bus. The processing device can latch an address code within a packet to be transferred from one of the two communication control LSIs to the other one and inform the address match determining device of the latched address, access the low-order (N–m) bits of the latched address extracted by the extract unit of the address match determining device, access the memory so as to retrieve the row or column of plural 1-bit address match determination data, inform the determination unit of the address match determining device of the row or column of plural 1-bit address match determination data, and transfer the packet to the other communication control LSI if the determination unit of the address match determining device determines that the latched address is available.

In accordance with another preferred embodiment of the present invention, at least the extract unit is incorporated into an address match determining device, at least two communication control LSIs are electrically connected to the address match determining device by way of a data bus, the search and determination unit and the transfer unit are implemented by a processing device electrically connected to the two communication control LSIs by way of the data bus, and the storage unit is a memory electrically connected to both the communication control LSIs and the processing device by way of the data bus. The processing device can latch an address code within a packet to be transferred from one of the two communication control LSIs to the other one and inform the address match determining device of the latched address, access the high-order m bits of the latched address extracted by the extract unit of the address match determining device, access the memory so as to retrieve the row or column of plural 1-bit address match determination data, determine whether or not the latched address is available on the basis of the row or column of plural 1-bit address match determination data and the low-order (N–m) bits of the latched address, and transfer the packet to the other communication control LSI if the processing device determines that the latched address is available.

In accordance with another preferred embodiment of the present invention, at least the extract unit is incorporated into an address match determining device, at least two communication control LSIs are electrically connected to the address match determining device by way of a data bus, the search and determination unit and the transfer unit are implemented by a processing device electrically connected to the two communication control LSIs by way of the data bus, and the storage unit is a memory electrically connected to both the communication control LSIs and the processing device by way of the data bus. The processing device can latch an address code within a packet to be transferred from one of the two communication control LSIs to the other one and inform the address match determining device of the latched address, access the low-order (N–m) bits of the latched address extracted by the extract unit of the address match determining device, access the memory so as to retrieve the row or column of plural 1-bit address match determination data, determine whether or not the latched address is available on the basis of the row or column of plural 1-bit address match determination data and the high-order m bits of the latched address, and transfer the packet to the other communication control LSI if the processing device determines that the latched address is available.

In accordance with another aspect of the present invention, there is provided a method of determining whether or not an address latched is available, comprising the steps of: providing a matrix or table having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N–m) bits of the corresponding address code; receiving an N-bit address code included in a packet to be transmitted by way of a transmission line, and extracting the high-order m bits and remaining low-order (N–m) bits from the address code received; searching through the table stored in the storage unit for one 1-bit address match determination data specified by the first index composed of the extracted high-order m bits and the second index composed of the extracted low-order (N–m) bits; and determining whether or not the latched address is available on the basis of the 1-bit address match determination data searched for.

In the searching step, a row or column of plural 1-bit address match determination data which is specified by the first index composed of the extracted high-order m bits is retrieved from the table stored in the storage unit, and, in the determination step, it is determined whether one of the plural 1-bit address match determination data corresponding to the second index composed of the extracted low-order (N–m) bits indicates that the received address code is available.

Alternatively, in the searching step, a row or column of plural 1-bit address match determination data which is specified by the second index composed of the extracted low-order (N–m) bits is retrieved from the table stored in the storage unit, and, in the determination step, it is determined whether one of the plural 1-bit address match determination data corresponding to the first index composed of the extracted high-order m bits indicates that the received address code is available.

Further objects and advantages of the present invention will be apparent from the following description of the preferred embodiments of the invention as illustrated in the accompanying drawings.

BRIEF DESCRIPTION OF THE DRAWINGS

FIG. 2 is a diagram showing an address filter table stored in an address filter table shown in FIG. 1;

FIG. 7 is illustrated a program list showing an example of the software program executed by a CPU (not shown) for performing the processing as shown in FIG. 6;

FIG. 10 is illustrated a program list showing an example of the software program executed by a CPU of the system for performing the processing as shown in FIG. 9;

FIG. 11 is a block diagram showing the structure of a communication control system according to a fourth embodiment of the present invention;

FIG. 12 is a flow diagram showing the operation of the communication control system according to the fourth embodiment of the present invention;

FIG. 13 is illustrated a program list showing an example of the software program executed by a CPU of the system for performing the processing as shown in FIG. 12;

FIG. 14 is a block diagram showing the structure of a communication control system according to a fifth embodiment of the present invention;

FIG. 15 is a flow diagram showing the operation of the communication control system according to the fifth embodiment of the present invention;

FIG. 16 is illustrated a program list showing an example of the software program executed by a CPU of the system for performing the processing as shown in FIG. 15;

FIG. 19 is illustrated a program list showing an example of the software program executed by a CPU of the system for performing the processing as shown in FIG. 18;

FIG. 20 is a block diagram showing the structure of a communication control system according to a seventh embodiment of the present invention;

FIG. 21 is a flow diagram showing the operation of the communication control system according to the seventh embodiment of the present invention;

FIG. 22 is illustrated a program list showing an example of the software program executed by a CPU of the system for performing the processing as shown in FIG. 21;

FIG. 24 is a flow diagram showing the operation of the communication control system according to the eighth embodiment of the present invention;

FIG. 25 is illustrated a program list showing an example of the software program executed by a CPU of the system for performing the processing as shown in FIG. 24;

FIG. 28 is illustrated a program list showing an example of the software program executed by a CPU of the system for performing the processing as shown in FIG. 27;

FIG. 30 is illustrated a program list showing an example of the software program executed by a CPU of the system for performing the processing as shown in FIG. 29;

FIG. 34 is illustrated a program list showing an example of the software program executed by the CPU for performing the processing as shown in FIG. 33.

DETAILED DESCRIPTION OF THE PREFERRED EMBODIMENTS

First Embodiment

Figure 1:
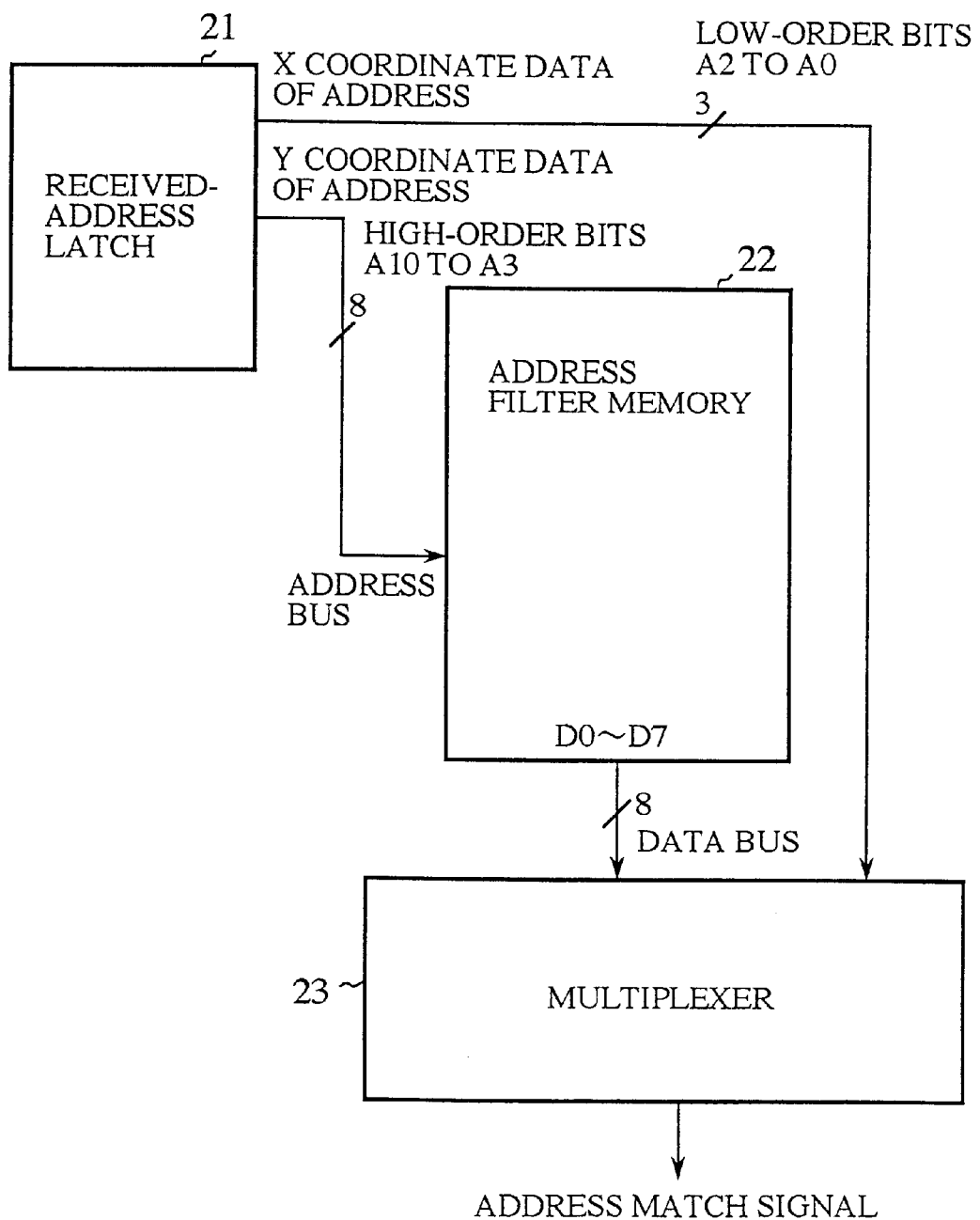
FIG. 1 is a block diagram showing the structure of an address match determining device according to a first embodiment of the present invention.

Referring next to FIG. 1, there is illustrated a block diagram showing the structure of an address match determining device according to a first embodiment of the present invention.

The address match determining device includes a received-address latch 21 which latches the address code within a packet intended for a communication device by way of a transmission line and then extracts eight most significant or high-order eight bits A10 to A3 and remaining lowest or low-order three bits A2 to A0 from the latched address code. In this specification, assume that the address code is, but not limited to, 11 bits in length and therefore the address can have any of 2048 possible values. The address match determining device further includes an address filter memory 22 which stores an address filter table in the form of a matrix of 256 rows and 8 columns having (256×8) elements, as shown in FIG. 2, each of which is a 1-bit address match determination data indicating whether or not a corresponding address code is available, and is indexed by a pair of a first index composed of the high-order eight bits A10 to A3 of the corresponding address code and a second index composed of the remaining low-order bits A2 to A0 of the corresponding address code. In the first embodiment, the first index gives the row of the matrix in which the element is located, and the second index gives the column of the matrix in which the element is located. The first index ranges from 00 in hex to FF in hex and the second index ranges from 0 in hex to 7 in hex, as shown in FIG. 2. If the directions in which the rows and columns of the matrix are running are assumed to be the directions of y and x axes, respectively, it can be assumed that the first index gives the y coordinate of the element and the second index gives the x coordinate of the element. Hereafter, the row of high-order eight bits A10 to A3 of the latched address code is referred to as the y coordinate data Ym of the latched address, and the row of low-order three bits A2 to A0 of the latched address code is referred to as the x coordinate data Xn of the latched address.

In response to the row of high-order eight bits A10 to A3 of the latched address code from the received-address latch 21, the address filter memory 22 furnishes a row of eight different 1-bit address match determination data D0 to D7 each indicating whether or not a corresponding address code is available, which is specified by the row of high-order eight bits A10 to A3 of the latched address code. The address match determining device also includes a multiplexer 23 which accepts the row of the eight 1-bit data D0 to D7, substantially identifies the latched address of the packet on the basis of the row of lowest three bits A2 to A0 from the received-address latch 21, searches through the row of eight 1-bit data D0 to D7 for one 1-bit address match determination data which corresponds to the identified address, and then determines whether or not the corresponding 1-bit data indicates that the identified address is available. If the corresponding 1-bit data indicates that the identified address is available, the multiplexer 23 furnishes an address match signal.

Figure 4:
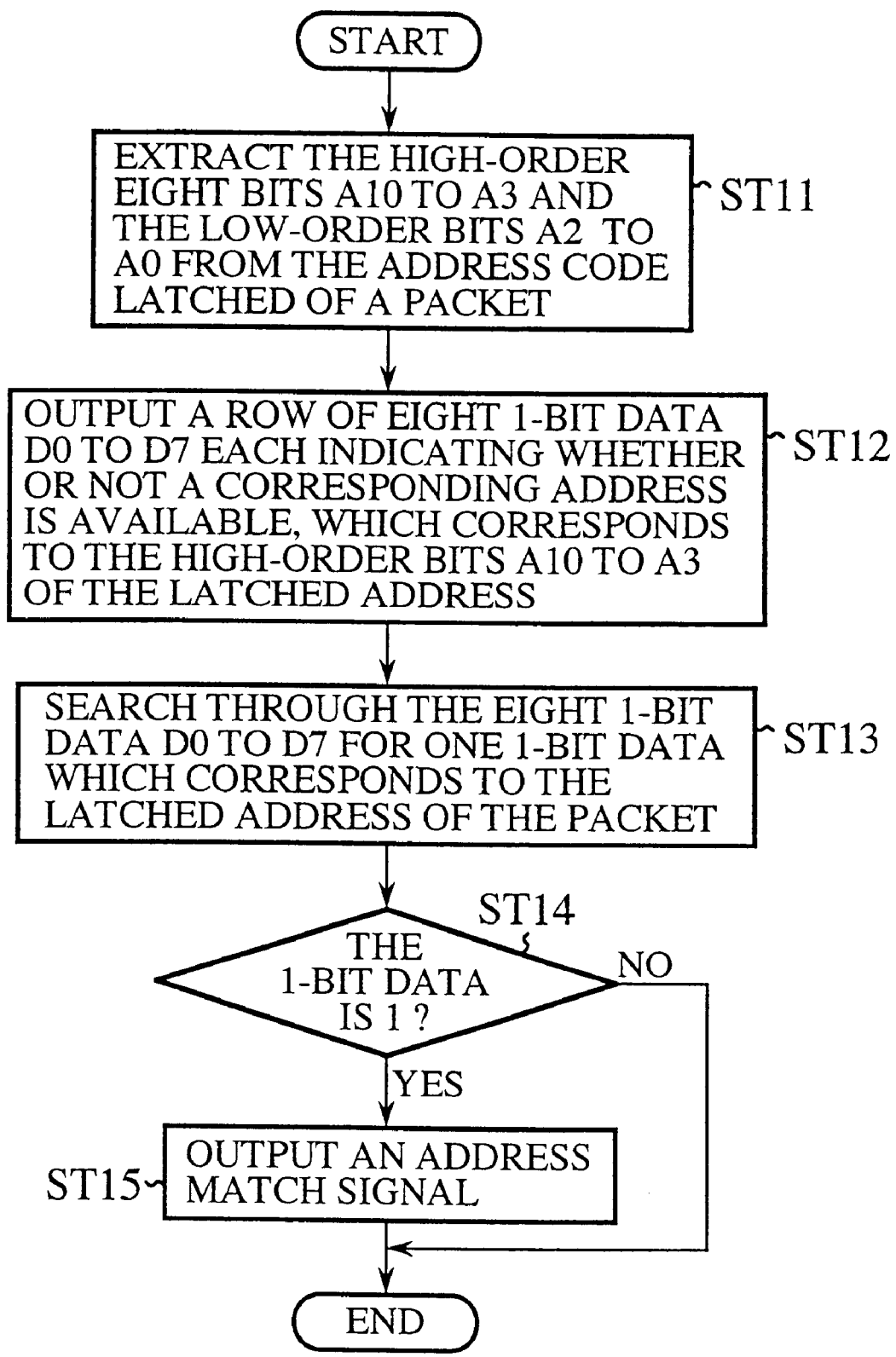
FIG. 4 is a flow diagram showing a method of determining whether or not an address code latched is available, according to the first embodiment of the present invention.

Referring next to FIG. 4, there is illustrated a flow diagram showing a method of determining whether or not an address code latched is available, according to the first embodiment of the present invention. When the received-address latch 21 latches the address code included in a packet intended for a communication device by way of a transmission line, it extracts the eight most significant bits A10 to A3 and remaining lowest three bits A2 to A0 from the latched address code, in step ST11. The received-address latch 21 then furnishes the row of high-order eight bits A10 to A3, i.e., the y coordinate data Ym of the latched address, to the address filter memory 22, and furnishes the row of low-order three bits A2 to A0, i.e., the x coordinate data Xn of the latched address, to the multiplexer 23.

When the address filter memory 22 then, in step ST12, receives the row of highest eight bits A10 to A3 of the latched address from the received-address latch 21, it furnishes a row of eight 1-bit data D0 to D7 each indicating whether or not a corresponding address is available, which is indexed by the row of highmost eight bits A10 to A3. For example, when the row of high-order eight bits A10 to A3 of the latched address is 00 in hex, the address filter memory 22 furnishes an 8-bit digital value 00001000 (see the lowermost row of the matrix shown in FIG. 2) as the row of eight 1-bit address match determination data D0 to D7. If one 1-bit address match determination data is a 1, it indicates that a corresponding address is available. If one 1-bit address match determination data is a 0, it indicates that a corresponding address is not available. The example of the matrix as shown in FIG. 2 shows that some addresses 004 in hex, 010 in hex, and so on are available.

Figure 3:
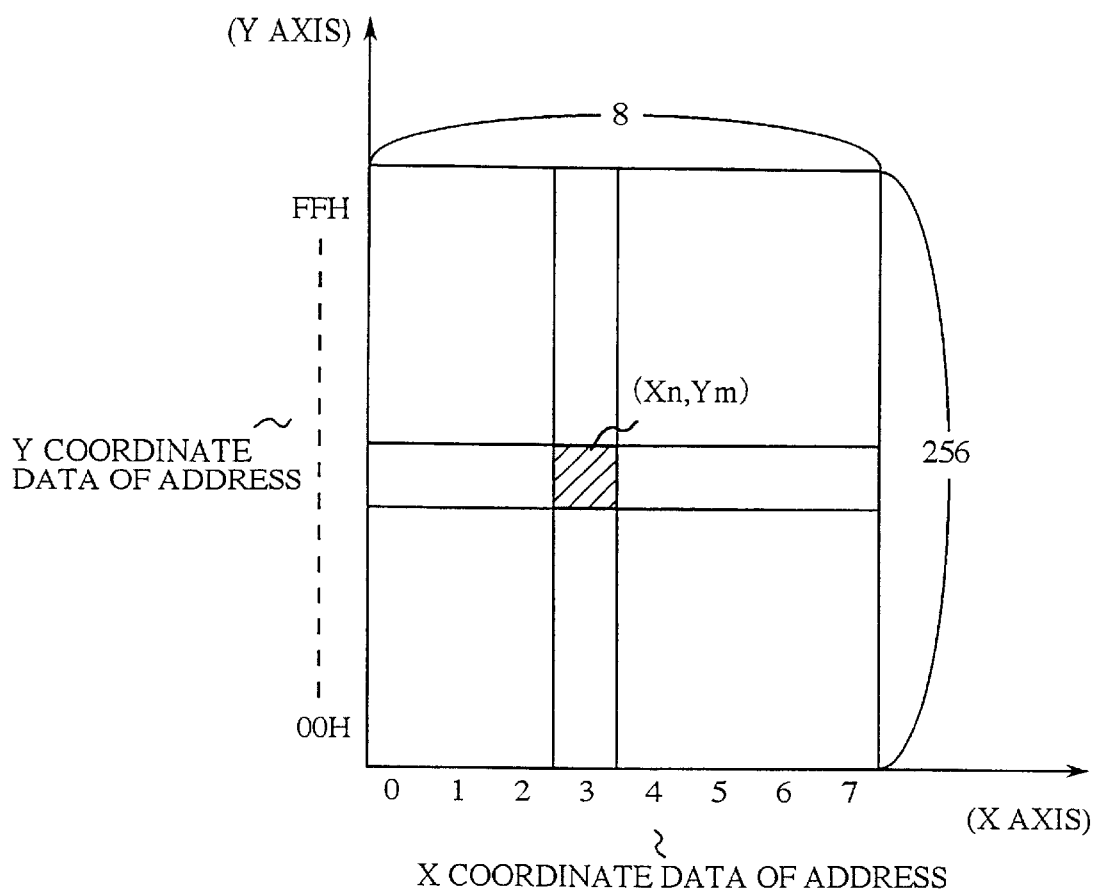
FIG. 3 is a diagram showing a concept of address match determination of the present invention.

When the multiplexer 23 receives the row of eight different 1-bit address match determination data D0 to D7 from the address filter memory 22, it, in step ST13, substantially identifies the latched address of the packet, based on the row of lowest three bits A2 to A0 of the latched address from the received-address latch 21, with its x and y coordinate data (Xn,Ym) as shown in FIG. 3. The multiplexer 23 further searches through the row of eight 1-bit address match determination data D0 to D7 for one 1-bit data which corresponds to the set of x and y coordinate data (Xn,Ym) and then, in step ST14, determines whether or not the corresponding 1-bit data indicates that the identified address is available. Only if the corresponding 1-bit data indicates that the identified address is available, the multiplexer 23 furnishes an address match signal, in step ST15.

For example, when the row of high-order eight bits A10 to A3 of the latched address is 00 in hex and the address filter memory 22 furnishes an 8-bit digital value 00001000 as the row of eight different 1-bit address match determination data D0 to D7, if the row of low-order three bits A2 to A0 is 4 in hex the multiplexer 23 furnishes an address match signal indicating that the latched address of the packet is available because the 1-bit address match determination data D4 which corresponds to the hex x coordinate data 4 is a 1. Otherwise, that is, if the row of lowermost three bits A2 to A0 of the latched address is other than 4 in hex, the multiplexer 23 furnishes no address match signal because the 1-bit address match determination data which corresponds to the hex x coordinate data 4 is a 0.

As previously explained, in accordance with the first embodiment, the multiplexer 23 can determine whether one 1-bit address match determination data, which is an element of the matrix stored in the address filter memory 22 and is distinguished by the row of highest eight bits A10 to A3 and row of lowest three bits A2 to A0 of the address latched by the received-address latch 21, indicates that the latched address is available, in cooperation with the address filter memory 22, and the multiplexer 23 can furnish an address match signal only if the specified 1-bit address match determination data indicates that the latched address is available. Therefore, the address match determining device of the first embodiment can determine whether or not an address latched is available without having to use a plurality of address latches and a plurality of logic circuits which are required by a plurality of packets which are allowed to be transferred. Thus the size of the circuitry can be reduced even when there are a number of packets which are allowed to be transferred. Besides the address match determining device of the first embodiment can perform the address match determination processing at a high speed because it can determine whether or not an address latched is available through only one process of searching for a 1-bit address match determination data which corresponds to the latched address.

Second Embodiment

Figure 5:
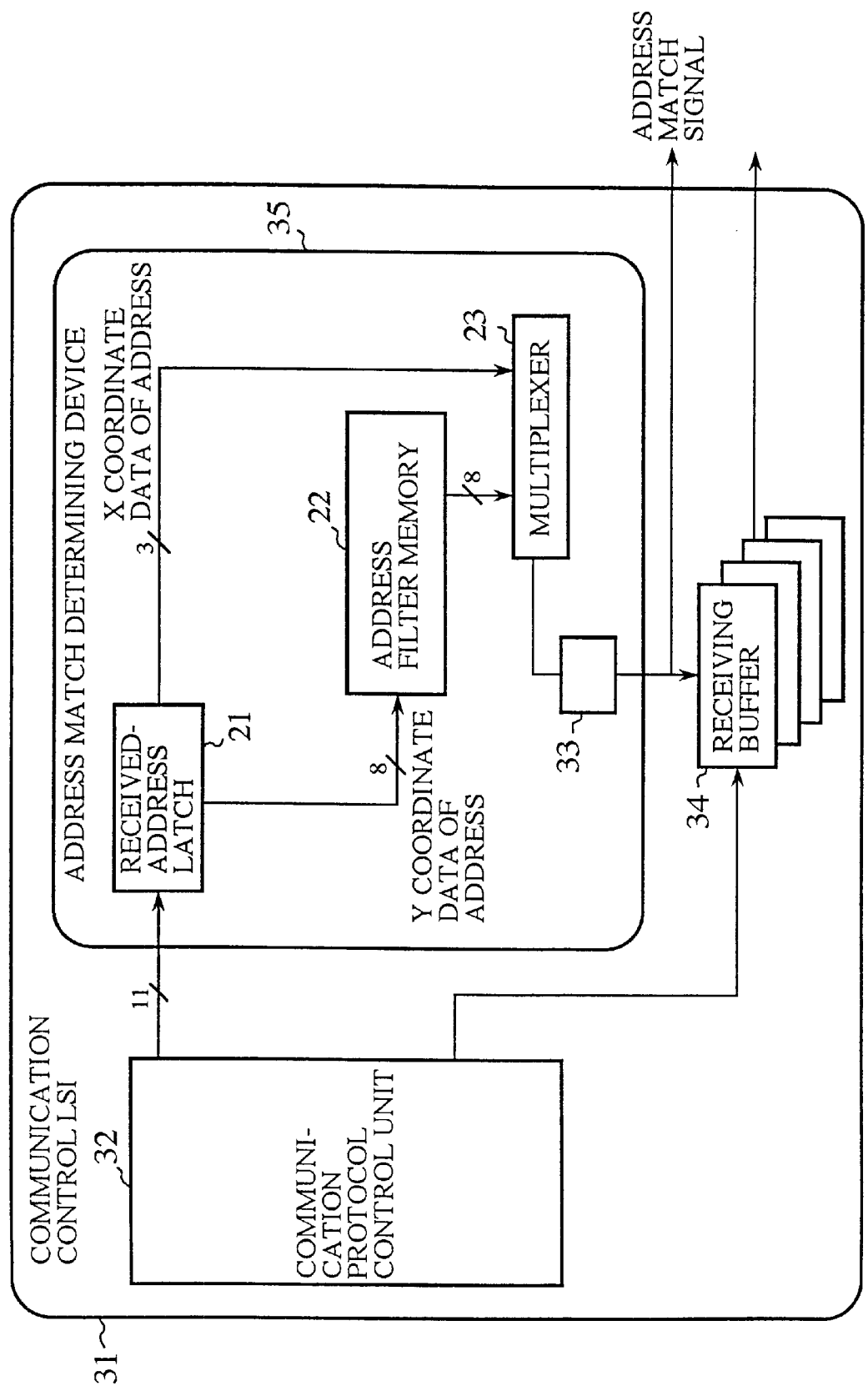
FIG. 5 is a block diagram showing the structure of a communication control system according to a second embodiment of the present invention.

Referring next to FIG. 5, there is illustrated a block diagram showing the structure of a communication control system according to a second embodiment of the present invention. In the figure, the same reference numerals as shown in FIG. 1 denote the same components as of the first embodiment and therefore the description about those components will be omitted hereafter. The communication system includes a communication control LSI 31 into which a communication protocol control unit 32, an address match determining device 35, and a plurality of receiving buffers 34 are integrated. The communication protocol control unit 32 can transfer a packet intended for another communication control LSI or the like to one receiving buffer 34 and also transfer an address code within the packet to the received-address latch 21 of the address match determining device 35. The address match determining device 35 includes an output buffer 33 for temporarily storing information indicating that an address match signal corresponding to the address code latched into the received-address latch 21 has been applied thereto. When a CPU (not shown) reads the contents of the output buffer 33 of the address match determining device 35, the receiving buffer 34 can transfer the packet which has been transferred thereto by the communication protocol control unit 32 to another communication LSI or the like according to directions from the CPU.

Figure 6:
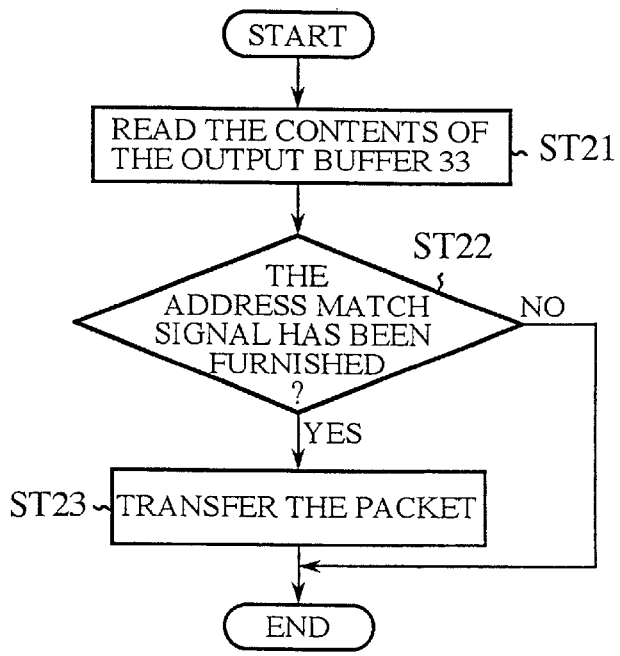
FIG. 6 is a flow diagram showing the operation of the communication control system according to the second embodiment of the present invention.

Referring next to FIG. 6, there is illustrated a flow diagram showing the operation of the communication control system according to the second embodiment of the present invention. When the communication protocol control unit 32 transfers an address code within a packet intended for another communication control LSI or the like to the received-address latch 21 of the address match determining device 35 and also transfers the packet to the receiving buffer 34, the address match determining device 35 extracts the high-order eight bits A10 to A3 and remaining low-order three bits A2 to A0 from the latched address code by means of the received-address latch 21, and determines whether or not the latched address code of the packet is available by seeing whether or not a 1-bit address match determination data specified by the x and y coordinate data (Xn, Ym) of the latched address is a 1 by means of the address filter memory 22 and the multiplexer 23, like the address match determining device of the aforementioned first embodiment. The multiplexer 23 furnishes an address match signal to the output buffer 33 only if the latched address code of the packet is available. In the flow diagram of FIG. 6, the address match determination procedure by the address match determining device 35 is omitted because it is shown as in FIG. 4.

On the other hand, the CPU (not shown), in step ST21, reads the contents of the output buffer 33 and then transfers the packet stored in one of the plurality of receiving buffers 34 to another communication control LSI or the like if the contents indicate that an address match signal corresponding to the latched address code has been furnished by the multiplexer 23, in steps ST 22 and ST23. Otherwise, that is, unless the output buffer 33 stores information indicating that an address match signal has been furnished by the multiplexer 23, the CPU requests the communication control LSI 31 to abandon the packet stored in one receiving buffer 34 without performing transfer of the packet.

Figure 33:
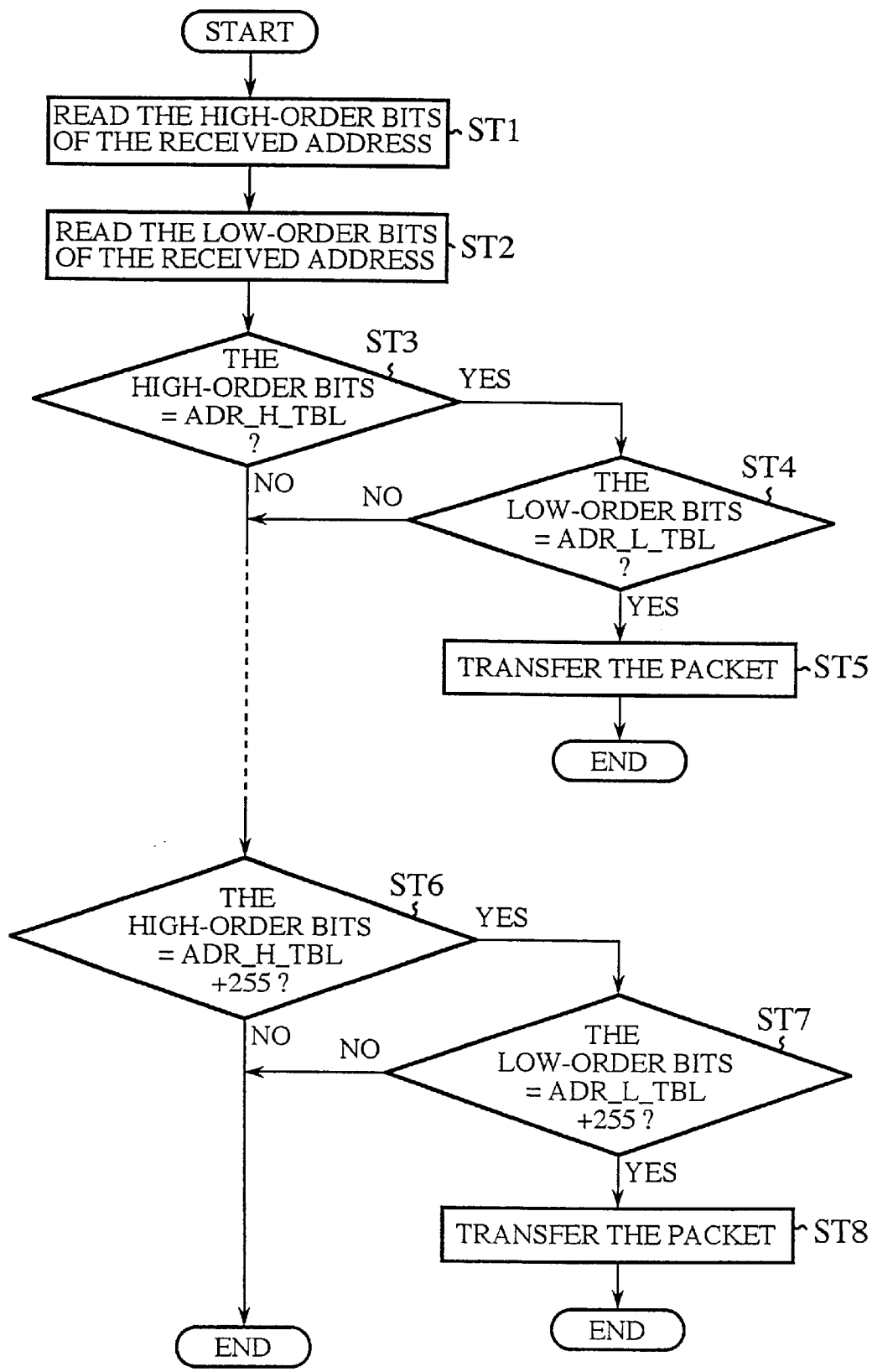
FIG. 33 is a flow diagram showing the operation of a CPU which performs address comparison processing according to a software program.

Referring next to FIG. 7, there is illustrated a program list showing an example of the software program executed by the CPU (not shown) for performing the transfer processing as shown in FIG. 6. As can be seen from FIG. 7, the transfer processing done by the CPU (not shown) is exceedingly simplified as compared with the conventional transfer processing as shown in FIGS. 33 and 34. Accordingly, the burden of the transfer processing with the CPU (not shown) can be reduced.

As previously explained, in accordance with the second embodiment, the communication control LSI 31 can search for one 1-bit address match determination data which is an element of the matrix stored in the address filter memory 22 and is distinguished by the row of high-order bits A10 to A3 and row of low-order bits A2 to A0 extracted from an address code latched into the received-address latch 21, and determine whether the 1-bit address match determination data indicates that the latched address is available, by means of the address match determining device 35. Therefore, the communication control LSI 31 of the second embodiment can determine whether or not the latched address is available without having to use a plurality of address latches and a plurality of logic circuits which are required by a plurality of packets which are allowed to be transferred. Thus the size of the circuitry can be reduced even when there are a number of packets which are allowed to be transferred. Besides the communication control LSI 31 of the second embodiment can perform the address match determination processing at a high speed because it can determine whether or not an address latched is available through only one process of searching for a 1-bit address match determination data which corresponds to the latched address.

In addition, since the communication protocol control unit 32, the address match determining device 35, and the plurality of receiving buffers 34 are integrated into the communication control LSI 31, the structure of the communication control system can be simplified.

Third Embodiment

Figure 8:
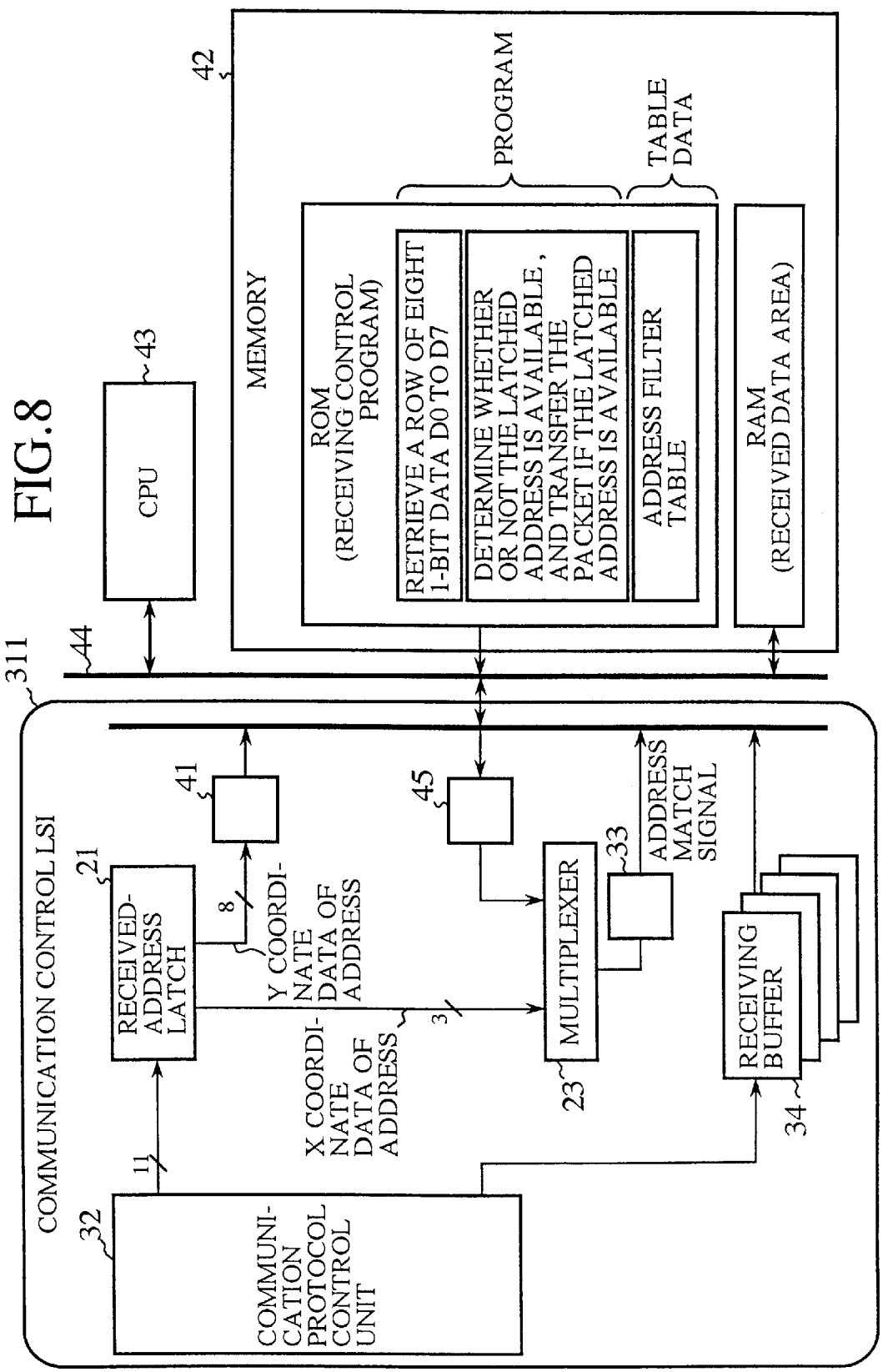
FIG. 8 is a block diagram showing the structure of a communication control system according to a third embodiment of the present invention.

Referring next to FIG. 8, there is illustrated a block diagram showing the structure of a communication control system according to a third embodiment of the present invention. In the figure, the same reference numerals as shown in FIG. 5 denote the same components as of the second embodiment and therefore the description about those components will be omitted hereafter. The communication control system of the third embodiment further comprises a memory 42 and a CPU 43 in addition to a communication control LSI 311. The communication control LSI 311 of the third embodiment does not include an address filter memory 22 as shown in FIG. 5, but instead, it includes a register 41 for storing the row of eight most significant bits A10 to A3, i.e., the y coordinate data Ym of an address code which has been extracted by the received-address latch 21, and a register 45 for storing a row of eight 1-bit address match determination data D0 to D7. Both the memory 42 and the CPU 43 are connected to the communication control LSI 311 by way of a data bus 44. The memory 42 stores an address filter table in the form of a matrix of 256 rows and 8 columns having (256×8) elements, as shown in FIG. 2, each of which is a 1-bit address match determination data indicating whether or not a corresponding address code is available, like the address filter memory 22 of the first embodiment. The memory 42 also stores a receiving control program, including the address filter table, for enabling the CPU 43 to control the communication control LSI 311.

Figure 9:
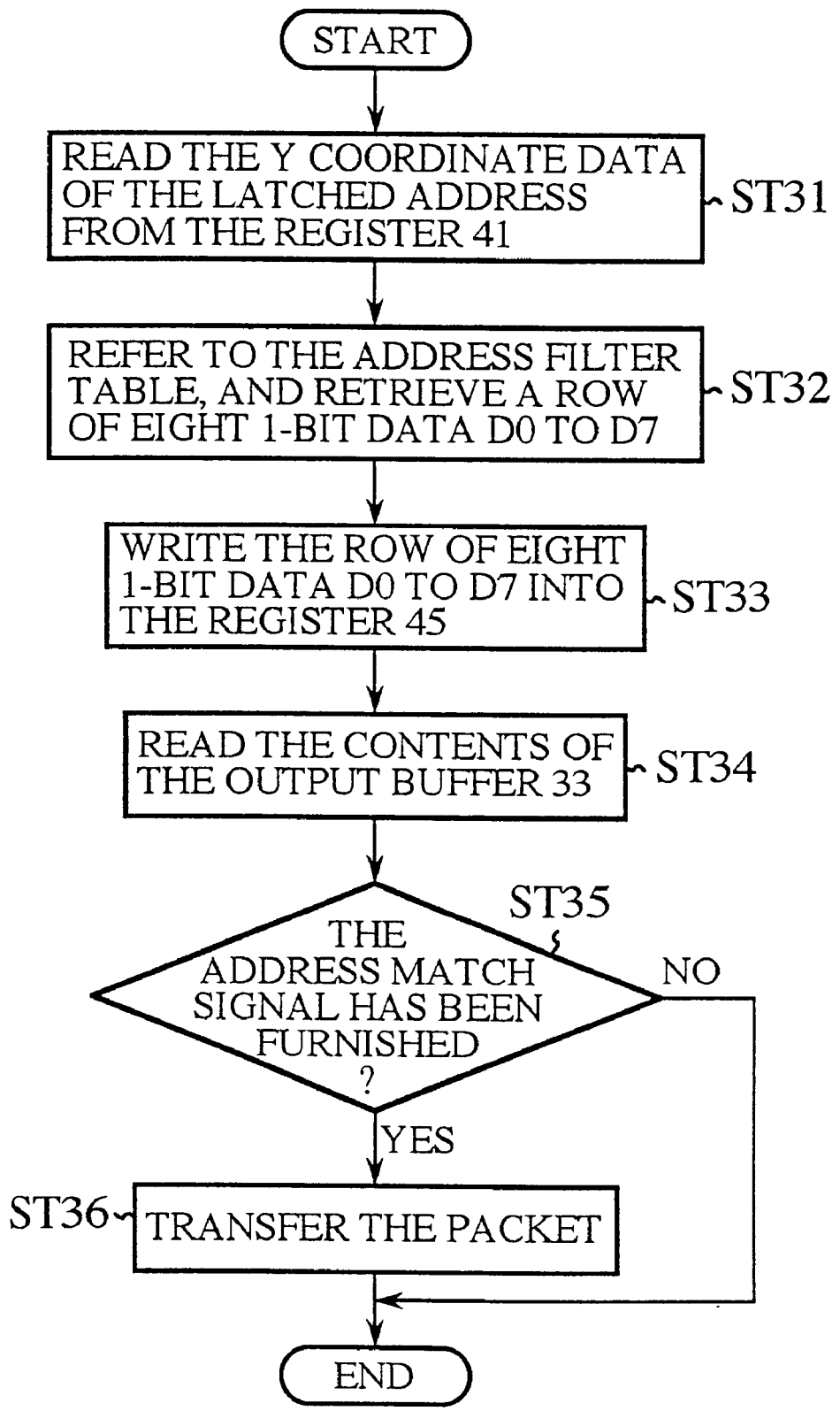
FIG. 9 is a flow diagram showing the operation of the communication control system according to the third embodiment of the present invention.

Referring next to FIG. 9, there is illustrated a flow diagram showing the operation of the communication control system of the third embodiment. FIG. 10 shows a program list showing an example of the software program executed by the CPU 43 for performing the address match determination processing as shown in FIG. 9. In operation, the CPU 43, in step ST31, reads the y coordinate data Ym of an address code latched into the received-address latch 21 from the register 41 of the communication control LSI 311 first. The CPU 43 then, in step ST32, refers to the matrix or address filter table stored in the memory 42 and retrieves a row of eight 1-bit address match determination data D0 to D7 each indicating whether or not a corresponding address code is available, which is specified by the row of high-order eight bits A10 to A3, i.e., the y coordinate data Ym of the latched address code. Then the CPU 43, in step ST33, writes the row of eight 1-bit address match determination data D0 to D7 into the register 45 of the communication control LSI 311. After that, the multiplexer 23 searches through the row of eight 1-bit address match determination data D0 to D7 for one 1-bit data which is specified by the x coordinate data Xn of the latched address from the received-address latch 21, and then determines whether the specified 1-bit data indicates that the latched address is available. Only if the 1-bit data indicates that the latched address is available, the multiplexer 23 furnishes an address match signal to the output buffer 33.

The CPU 43 reads the contents of the output buffer 33 of the communication control LSI 311 and then determines whether the multiplexer 23 has furnished an address match signal corresponding to the latched address, in steps ST34 and ST35. Only if the contents of the output buffer 33 indicate that the multiplexer 23 has furnished an address match signal corresponding to the latched address, the CPU 43 allows the receiving buffer 34 to transfer the packet from the communication protocol control unit 32 to another communication LSI or the like.

The third embodiment of the present invention offers the same advantages as provided by the second embodiment. The third embodiment further provides an advantage of reducing the size of the communication control LSI compared with that of the second embodiment because it does not need an address filter memory 22 for storing the address filter table.

Fourth Embodiment

Referring next to FIG. 11, there is illustrated a block diagram showing the structure of a communication control system according to a fourth embodiment of the present invention. Like the communication control system of the third embodiment, the communication control system of the fourth embodiment comprises a communication control LSI 312, a CPU 43, and a memory 42. The communication control system of the fourth embodiment, however, differs from that of the third embodiment in that it does not include a multiplexer 23, a register 45, and an output buffer 33 as shown in FIG. 8, but instead, it includes a decoder 51 for decoding the x coordinate data Xn of the latched address code from the received-address latch 21 into an 8-bit decoded x coordinate data whose only one bit corresponding to the x coordinate data Xn is a 1, and a register 52 for storing the 8-bit decoded x coordinate data. For example, if the row of lowest three bits of the latched address is 0 in hex, the decoder 51 decodes the hex number 0 into 10000000 in binary. If the row of lowest three bits of the latched address is 7 in hex, the decoder 51 decodes the hex number 7 into 00000001 in binary.

Referring next to FIG. 12, there is illustrated a flow diagram showing the operation of the communication control system of the fourth embodiment. FIG. 13 shows a program list showing an example of the software program executed by the CPU 43 for performing the address match determination processing as shown in FIG. 12. In operation, the CPU 43, in step ST41, reads the y coordinate data Ym of an address code extracted by the received-address latch 21 from the register 41 of the communication control LSI 312 first. The CPU 43 then, in step ST42, refers to the matrix or address filter table stored in the memory 42, and retrieves a row of eight 1-bit address match determination data D0 to D7 each indicating whether or not a corresponding address code is available, which is indexed by the row of highest eight bits A10 to A3, i.e., the y coordinate data Ym of the latched address code.

On the other hand, the decoder 51 of the communication control LSI 312 decodes the x coordinate data Xn of the latched address code from the received-address latch 21 into an 8-bit decoded x coordinate data whose only one bit corresponding to the x coordinate data Xn is a 1, and then writes the 8-bit decoded x coordinate into the register 52. The CPU 43 then, in step ST43, reads the 8-bit decoded x coordinate data from the register 52. Next, the CPU 43 calculates the logical product of the row of eight 1-bit address match determination data D0 to D7 and the 8-bit decoded x coordinate data, and determines whether or not the logical product is 00 in hex, in step ST 44. For example, when the row of high-order eight bits A10 to A3 of the latched address is 00 in hex, the memory 42 furnishes an 8-bit digital value 00001000 (see the lowermost row of the matrix shown in FIG. 2) as the row of eight 1-bit address match determination data D0 to D7 according to directions from the CPU. If the row of lowest three bits A2 to A0 of the latched address is 4 in hex, the decoder 51 generates an 8-bit digital value 00001000. In this case, since the logical product of those 8-bit digital values from the memory 42 and the decoder 51 is 10 in hex, the CPU 43 allows the communication control LSI 312 to transfer the packet to another communication control LSI or the like, in step ST45.

The fourth embodiment of the present invention offers the same advantages as provided by the second embodiment. The fourth embodiment further provides an advantage of reducing the size of the communication control LSI compared with that of the third embodiment because it does not need a multiplexer 23 and so on.

Fifth Embodiment

Referring next to FIG. 14, there is illustrated a block diagram showing the structure of a communication control system according to a fifth embodiment of the present invention. Like the communication control system of the third embodiment, the communication control system of the fifth embodiment comprises a communication control LSI 313, a CPU 43, and a memory 42. The communication control system of the fifth embodiment, however, differs from that of the fourth embodiment in that it does not include a decoder 51 and a register 52 as shown in FIG. 11, but instead, it includes a register 54 for storing the x coordinate data Xn of the latched address code from the received-address latch 21.

Referring next to FIG. 15, there is illustrated a flow diagram showing the operation of the communication control system of the fifth embodiment. FIG. 16 shows a program list showing an example of the software program executed by the CPU 43 for performing the address match determination processing as shown in FIG. 15. In operation, the CPU 43, in step ST41, reads the y coordinate data Ym of an address code extracted by the received-address latch 21 from the register 41 of the communication control LSI 313 first. The CPU 43 then, in step ST42, refers to the matrix or address filter table'stored in the memory 42 and retrieves a row of eight 1-bit address match determination data D0 to D7 each indicating whether or not a corresponding address code is available, which is specified by the row of high-order eight bits A10 to A3, i.e., the y coordinate data Ym of the latched address code. Then the CPU 43, in step ST46, reads the x coordinate data Xn of the latched address from the register 54 of the communication control LSI 313. Next, the CPU 43 decodes the x coordinate data Xn of the latched address code from the register 54 into an 8-bit decoded x coordinate data whose only one bit corresponding to the x coordinate data xn is a 1, and then calculates the logical product of the row of eight 1-bit address match determination data D0 to D7 and the 8-bit decoded x coordinate data and determines whether or not the logical product is 00 in hex, in step ST 44. If the logical product is other than 00 in hex, the CPU 43 allows the communication control LSI 313 to transfer the packet to another communication control LSI or the like, in step ST45.

The fifth embodiment of the present invention offers the same advantages as provided by the second embodiment. The fifth embodiment further provides an advantage of reducing the size of the communication control LSI compared with that of the fourth embodiment because it does not need a decoder 51 as shown in FIG. 11.

Sixth Embodiment

Figure 17:
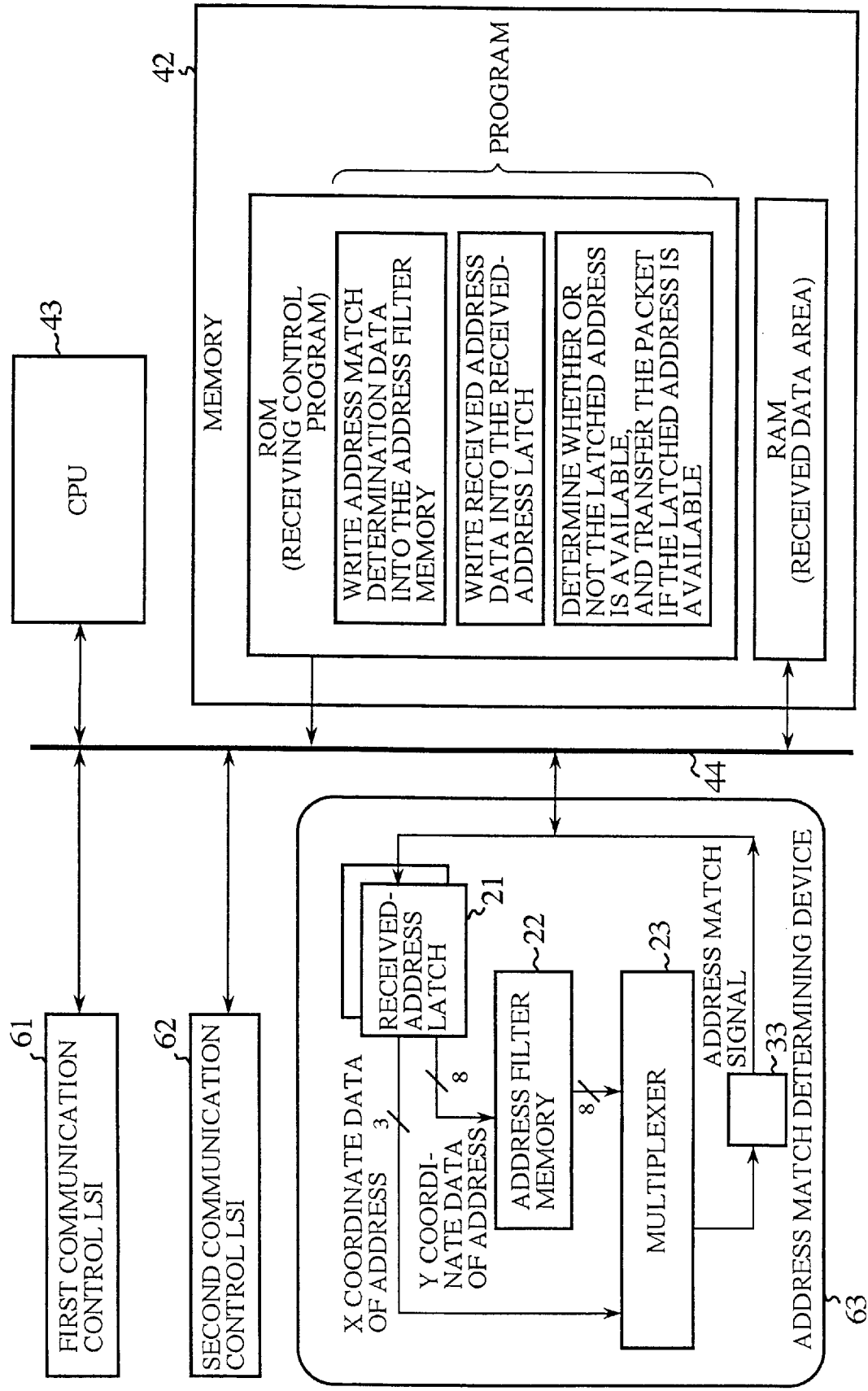
FIG. 17 is a block diagram showing the structure of a communication control system according to a sixth embodiment of the present invention.

Referring next to FIG. 17, there is illustrated a block diagram showing the structure of a communication control system according to a sixth embodiment of the present invention. The communication control system of the sixth embodiment comprises an address match determining device 63 connected to a CPU 43 and a memory 42 by way of a data bus 44, and first and second communication control LSIs 61 and 62 connected to the CPU 43 and the memory 42 by way of the data bus 44. The first and second communication control LSIs 61 and 62 can transfer packets to each other by way of the memory 42. The communication control system of the sixth embodiment differs from that of the second through fifth embodiments in that each communication control LSI contained in the system does not include its own address match determining means comprised of at least a received-address latch 21. When constructing a gateway or the like, the placement of address match determining means into each communication control LSI causes needless duplication of the address match determining means. To avoid the needless duplication, according to the sixth embodiment, only one address match determining device 63 is directly connected to the CPU 43 by way of the data bus 44 without the placement of address match determining means into each of the first and second communication control LSIs 61 and 62.

The structure of the address match determining device 63 is the same as that of the address match determining device 35 of the second embodiment. The memory 42 stores a receiving control program for allowing the CPU 43 to control the address match determining device 63.

Figure 18:
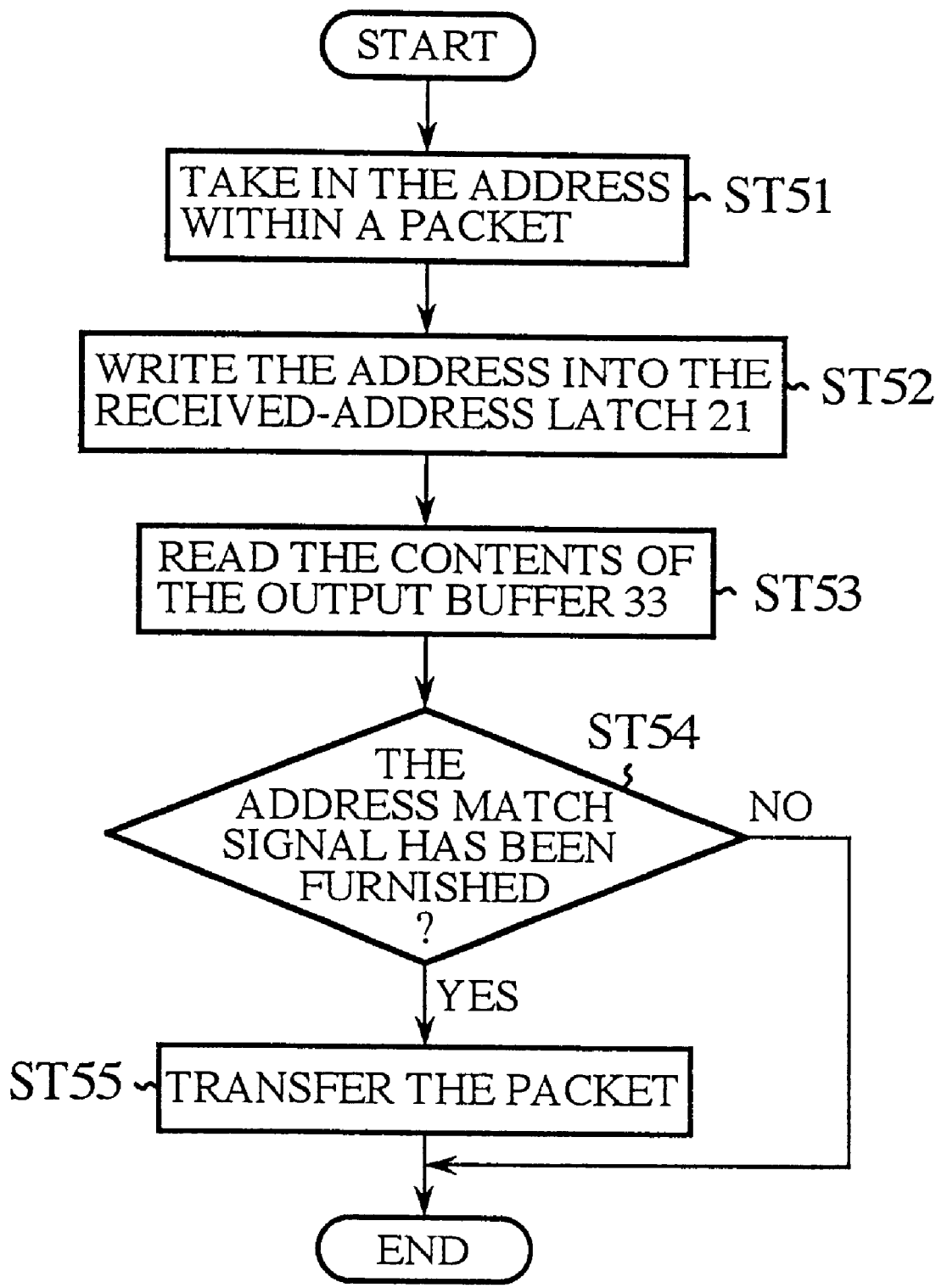
FIG. 18 is a flow diagram showing the operation of the communication control system according to the sixth embodiment of the present invention.

Referring next to FIG. 18, there is illustrated a flow diagram showing the operation of the communication control system of the sixth embodiment. FIG. 19 shows a program list showing an example of the software program executed by the CPU 43 for performing the address match determination processing as shown in FIG. 18. In operation, each time the first communication control LSI 61 furnishes a packet intended for the second communication control LSI 62 onto the data bus 44, the CPU 43, in step ST51, takes in the address code within the packet and then, in step ST52, writes the address code into the received-address latch 21 of the address match determining device 63 by way of the data bus 44, according to a receiving control program stored in the memory 42. The packet is stored into the memory 42. The address match determining device 63 determines whether or not the latched address is available, like the address match determining devices of the aforementioned first and second embodiments. After the address match determination, the CPU 43, in step ST53, reads the contents of the output buffer 33 of the address match determining device 63 and then transfers the packet stored in the memory 42 to the second communication control LSI 62 if the contents indicate that the address match signal has been furnished by the multiplexer 23, in steps ST 54 and ST55. Otherwise, that is, unless the output buffer 33 stores information indicating that the address match signal has been furnished by the multiplexer 23, the CPU 43 abandons the packet stored in the memory 42 without performing the transfer processing.

It is clear from the above description that when constructing a gateway or the like by using the communication control system according to the sixth embodiment in which only one address match determining device is directly connected to a CPU by way of a data bus without the placement of address match determining means into each communication control LSI, needless duplication of the address match determining means within the system can be avoided and the size of each communication control LSI can be reduced.

Seventh Embodiment

Referring next to FIG. 20, there is illustrated a block diagram showing the structure of a communication control system according to a seventh embodiment of the present invention. Like the aforementioned communication control system of the sixth embodiment, the communication control system of the seventh embodiment comprises an address match determining device 64, a CPU 43, and a memory 42. The communication control system of the seventh embodiment, however, differs from that of the sixth embodiment in that the address match determining device 64 of the seventh embodiment does not include an address filter memory 22 as shown in FIG. 17, but instead, it includes a register 41 for storing the row of high-order eight bits A10 to A3, or the y coordinate data Ym of an address code latched into the received-address latch 21, and a register 45 for storing a row of eight 1-bit address match determination data D0 to D7. The memory 42 stores an address filter table in the form of a matrix of 256 rows and 8 columns having (256×8) elements, as shown in FIG. 2, each of which is a 1-bit address match determination data indicating whether or not a corresponding address code is available, like the address filter memory 22 of the sixth embodiment. The memory 42 also stores a receiving control program for enabling the CPU 43 to control the address match determining device 64.

Referring next to FIG. 21, there is illustrated a flow diagram showing the operation of the communication control system of the seventh embodiment. FIG. 22 shows a program list showing an example of the software program executed by the CPU 43 for performing the address match determination processing as shown in FIG. 20. In operation, each time the first communication control LSI 61 furnishes a packet intended for the second communication control LSI 62 onto the data bus 44, the CPU 43, in step ST61, takes in the address code within the packet and then, in step ST62, writes the address code into the received-address latch 21 of the address match determining device 63 by way of the data bus 44, according to a receiving control program stored in the memory 42. The packet is stored into the memory 42.

Next, the CPU 43, in step ST63, reads the y coordinate data Ym of the address code latched into the received-address latch 21 from the register 41 of the address determining device 64. The CPU 43 then, in step ST64, refers to the matrix or address filter table stored in the memory 42, and retrieves a row of eight 1-bit address match determination data D0 to D7 each indicating whether or not a corresponding address code is available, which is specified by the row of highest eight bits A10 to A3, i.e., the y coordinate data Ym of the latched address code. Then the CPU 43, in step ST65, writes the row of eight 1-bit address match determination data D0 to D7 into the register 45 of the address match determining device 64. After that, the multiplexer 23 searches through the row of eight 1-bit address match determination data D0 to D7 for one 1-bit data which is specified by the x coordinate data Xn of the latched address from the received-address latch 21, and then determines whether the specified 1-bit data indicates that the latched address is available. Only if the 1-bit data indicates that the latched address is available, the multiplexer 23 furnishes an address match signal to the output buffer 33.

The CPU 43 then reads the contents of the output buffer 33 of the address match determining device 64 and then determines whether the multiplexer 23 has furnished the address match signal corresponding to the latched address, in steps ST66 and ST67. If the address match signal has been furnished by the multiplexer 23, the CPU 43 transfers the packet stored in the memory 42 to the second communication LSI 62.

The seventh embodiment of the present invention offers the same advantages as provided by the sixth embodiment. The seventh embodiment further provides an advantage of reducing the size of the address match determining device compared with that of the sixth embodiment because it does not need the address filter memory 22 for storing the address filter table.

Eighth Embodiment

Figure 23:
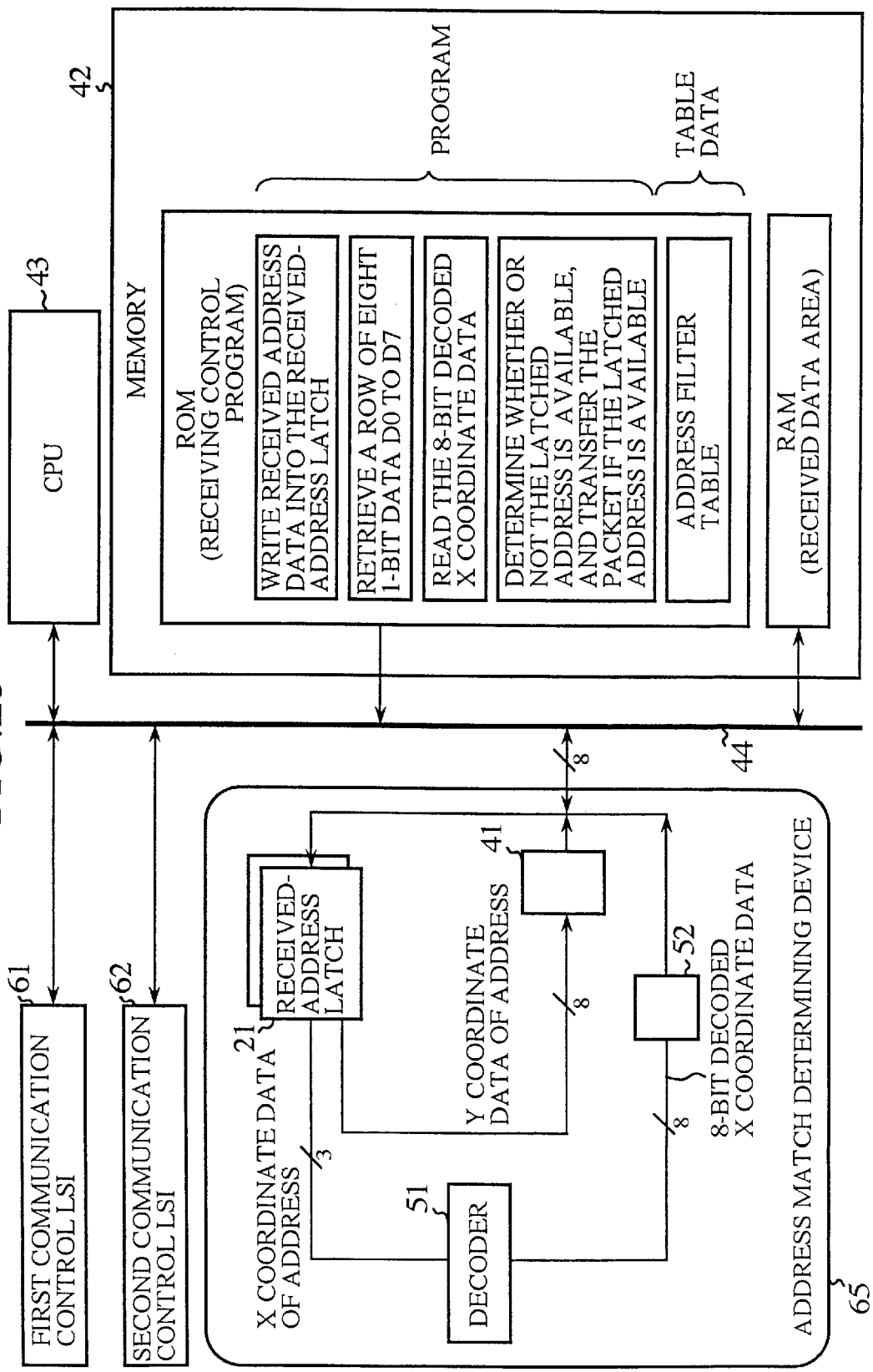
FIG. 23 is a block diagram showing the structure of a communication control system according to an eighth embodiment of the present invention.

Referring next to FIG. 23, there is illustrated a block diagram showing the structure of a communication control system according to an eighth embodiment of the present invention. Like the aforementioned communication control system of the seventh embodiment, the communication control system of the eighth embodiment comprises an address match determining device 65, a CPU 43, and a memory 42. The communication control system of the eighth embodiment, however, differs from that of the seventh embodiment in that the address match determining device 65 does not include a multiplexer 23, a register 45, and an output buffer 33 as shown in FIG. 20, but instead, it includes a decoder 51 for decoding the x coordinate data Xn of an address code latched into the received-address latch 21 into an 8-bit decoded x coordinate data whose only one bit corresponding to the x coordinate data Xn is a 1, and a register 52 for storing the 8-bit decoded x coordinate data.

Referring next to FIG. 24, there is illustrated a flow diagram showing the operation of the communication control system of the eighth embodiment. FIG. 25 shows a program list showing an example of the software program executed by the CPU 43 for performing the address match determination processing as shown in FIG. 24. In operation, each time the first communication control LSI 61 furnishes a packet intended for the second communication control LSI 62 onto the data bus 44, the CPU 43, in step ST71, takes in the address code within the packet and then, in step ST72, writes the address code into the received-address latch 21 of the address match determining device 65, according to a receiving control program stored in the memory 42. The packet is stored into the memory 42. Next, the CPU 43, in step ST73, reads the y coordinate data Ym of the address code latched into the received-address latch 21 from the register 41 of the address match determining device 65. The CPU 43 then, in step ST74, refers to the matrix or address filter table stored in the memory 42 and retrieves a row of eight 1-bit address match determination data D0 to D7 each indicating whether or not a corresponding address code is available, which is indexed by the row of high-order eight bits A10 to A3, i.e., the y coordinate data Ym of the latched address code. The CPU 43 then advances to step ST75 wherein it reads the 8-bit decoded x coordinate data from the register 52 of the address match determining device 65. Next, the CPU 43 calculates the logical product of the row of eight 1-bit address match determination data D0 to D7 and the 8-bit decoded x coordinate data and determines whether or not the logical product is 00 in hex, in step ST 76. If the logical product is other than 00 in hex, the CPU 43 transfers the packet stored in the memory 42 to the second communication control LSI 62, in step ST77.

The eighth embodiment of the present invention offers the same advantages as provided by the sixth embodiment. The eighth embodiment further provides an advantage of reducing the size of the address match determining device compared with that of the seventh embodiment because it does not need a multiplexer 23 and so on.

Ninth Embodiment

Figure 26:
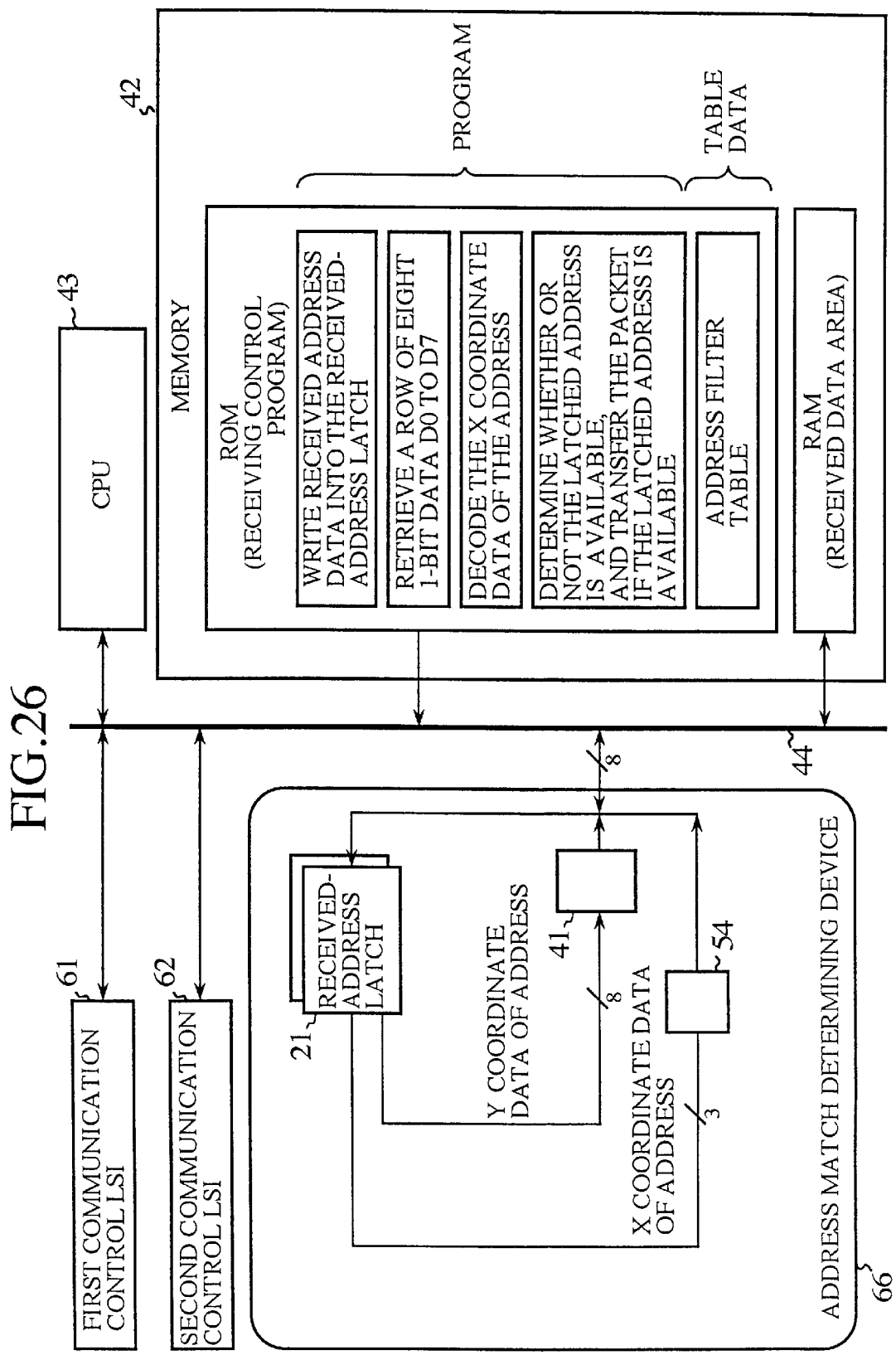
FIG. 26 is a block diagram showing the structure of a communication control system according to a ninth embodiment of the present invention.

Referring next to FIG. 26, there is illustrated a block diagram showing the structure of a communication control system according to a ninth embodiment of the present invention. Like the communication control system of the eighth embodiment, the communication control system of the eighth embodiment comprises an address match determining device 66, a CPU 43, and a memory 42. The communication control system of the ninth embodiment, however, differs from that of the eighth embodiment in that the address match determining device 66 does not include a decoder 51, and a register 52 as shown in FIG. 23, but instead, it includes a register 54 for storing the x coordinate data xn of an address code latched into the received-address latch 21.

Figure 27:
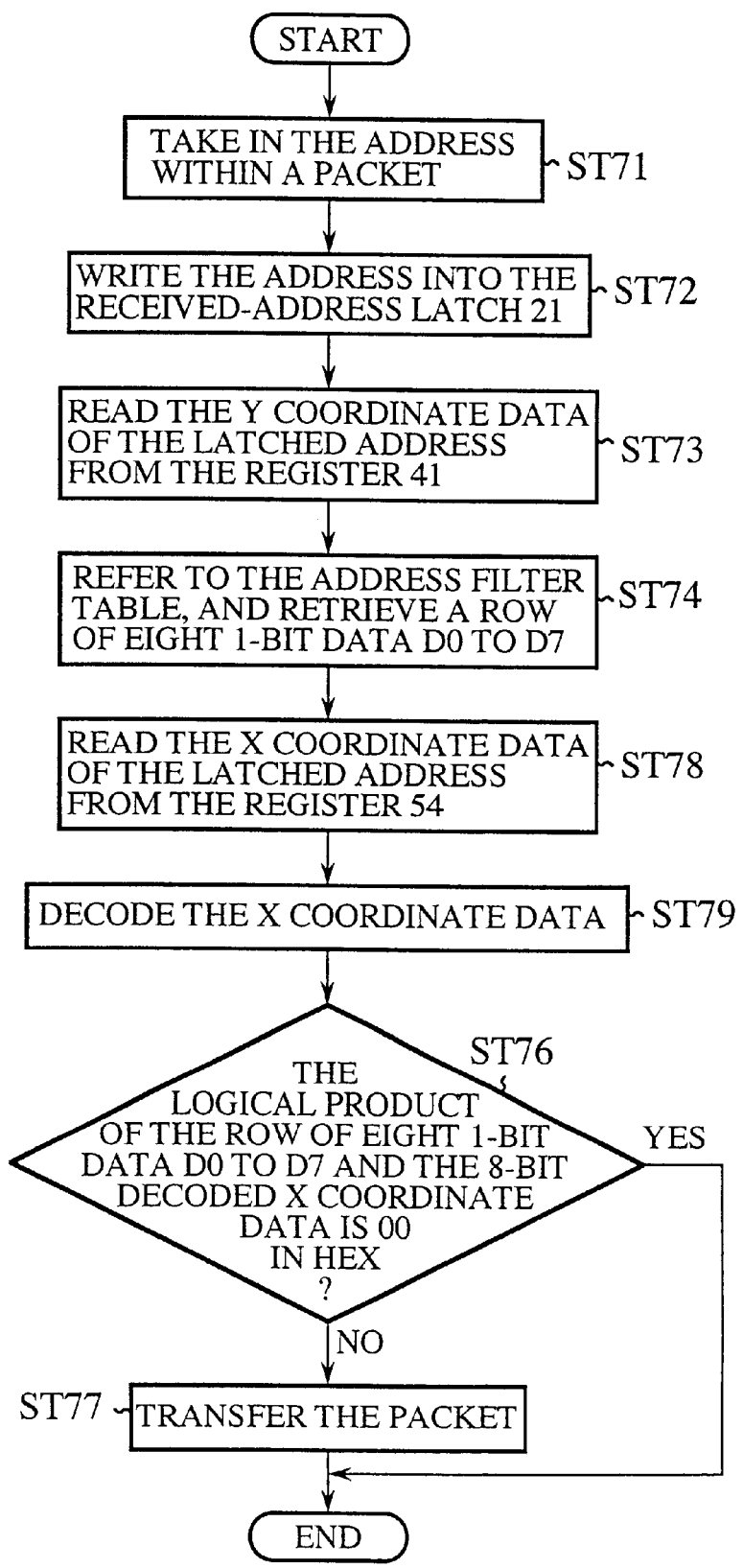
FIG. 27 is a flow diagram showing the operation of the communication control system according to the ninth embodiment of the present invention.

Referring next to FIG. 27, there is illustrated a flow diagram showing the operation of the communication control system of the ninth embodiment. FIG. 28 shows a program list showing an example of the software program executed by the CPU 43 for performing the address match determination processing as shown in FIG. 27. In operation, each time the first communication control LSI 61 furnishes a packet intended for the second communication control LSI 62 onto the data bus 44, the CPU 43, in step ST71, takes in the address code within the packet and then, in step ST72, writes the address code into the received-address latch 21 of the address match determining device 66, according to a receiving control program stored in the memory 42. The packet is stored into the memory 42. The CPU 43, in step ST73, reads the y coordinate data Ym of the address code latched into the received-address latch 21 from the register 41 of the address match determining device 66. Next, the CPU 43, in step ST74, refers to the matrix or address filter table stored in the memory 42 and retrieves a row of eight 1-bit address match determination data D0 to D7 each indicating whether or not a corresponding address code is available, which is indexed by the row of high-order eight bits A10 to A3, i.e., the y coordinate data Ym of the latched address code. Then the CPU 43, in step ST78, reads the x coordinate data Xn from the register 54 of the address match determining device 66. Next, the CPU 43 advances to step ST79 wherein it decodes the x coordinate data Xn of the latched address code from the register 54 into an 8-bit decoded x coordinate data whose only one bit corresponding to the x coordinate data Xn is a 1. The CPU 43 then, in step ST76, calculates the logical product of the row of eight 1-bit address match determination data D0 to D7 and the 8-bit decoded x coordinate data, and determines whether or not the logical product is 00 in hex. If the logical product is other than 00 in hex, the CPU 43 transfers the packet stored in the memory 42 to the second communication control LSI 62, in step ST77.

The ninth embodiment of the present invention offers the same advantages as provided by the sixth embodiment. The ninth embodiment further provides an advantage of reducing the size of the address match determining device compared with that of the eighth embodiment because it does not need a decoder 51 as shown in FIG. 23.

Numerous variants may be made in the exemplary embodiments mentioned above. It is clear in particular that instead of the y coordinate data Ym of an address code latched, the x coordinate data Xn of the latched can be applied to the address filter memory 22 as shown in FIG. 1. In this case, a column of plural 1-bit address match determination data is retrieved from the address filter table stored in the address filter memory 22 and is applied to the multiplexer 23 so as to determine whether one of the plural 1-bit address match determination data retrieved which is specified by the y coordinate data Ym of the latched address indicates that the latched address is available. It is also apparent from the above description that the decoder 51 as shown in FIG. 11 can decode the y coordinate dada Ym of the latched address instead of the x coordinate data Xn of the latched address so as to retrieve a column of plural 1-bit address match determination data from the address filter table stored in the address filter memory 22. In the variants mentioned above, it is preferable to reduce the length of the y coordinate data Ym to 3 bits, for example. In this case, the x coordinate data Xn is 8 bits in length if the address code latched is 11 bits in length.

Figure 29:
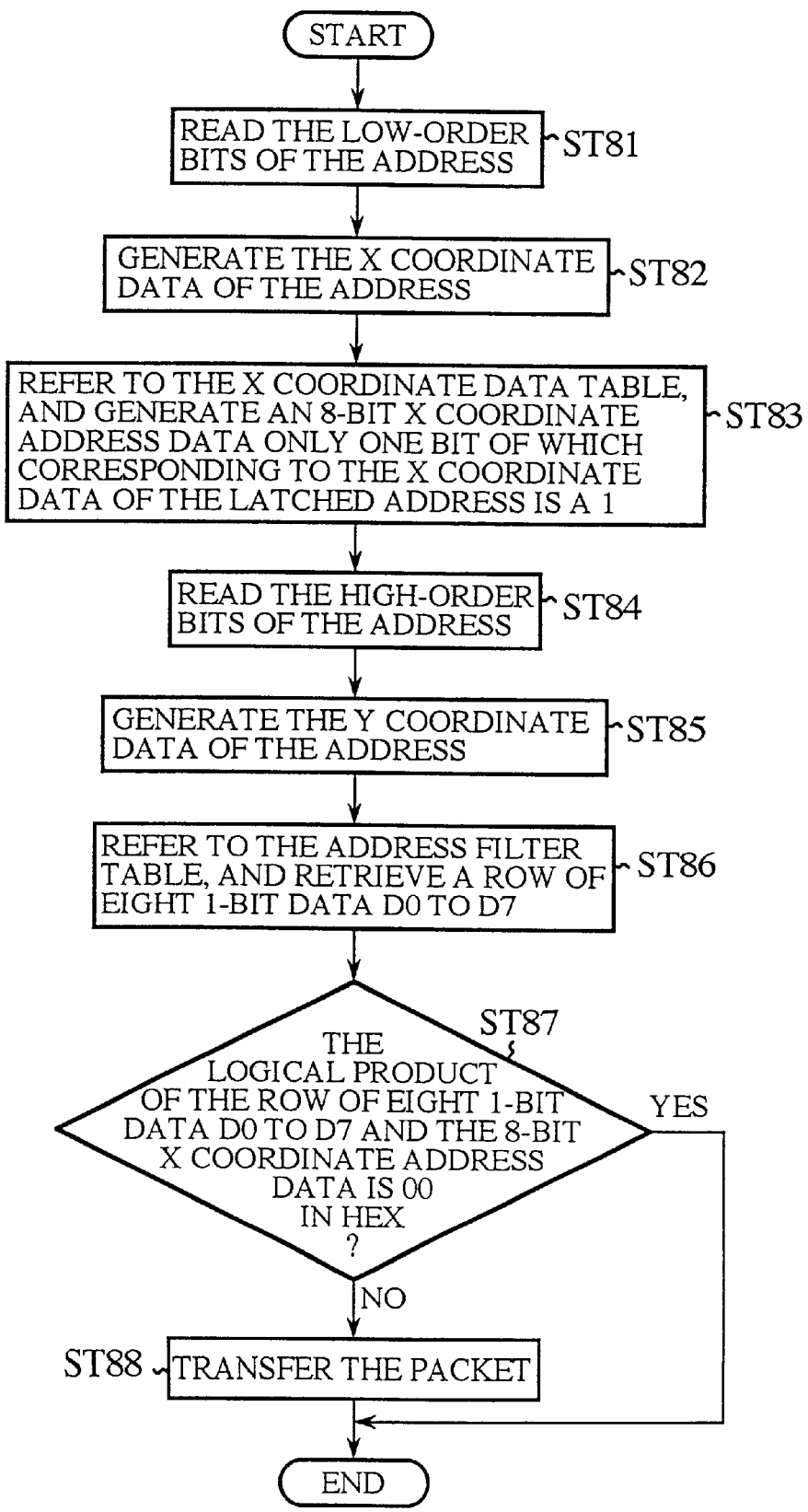
FIG. 29 is a flow diagram showing the operation of a communication control system according to a variant of of the present invention.
Figure 31:
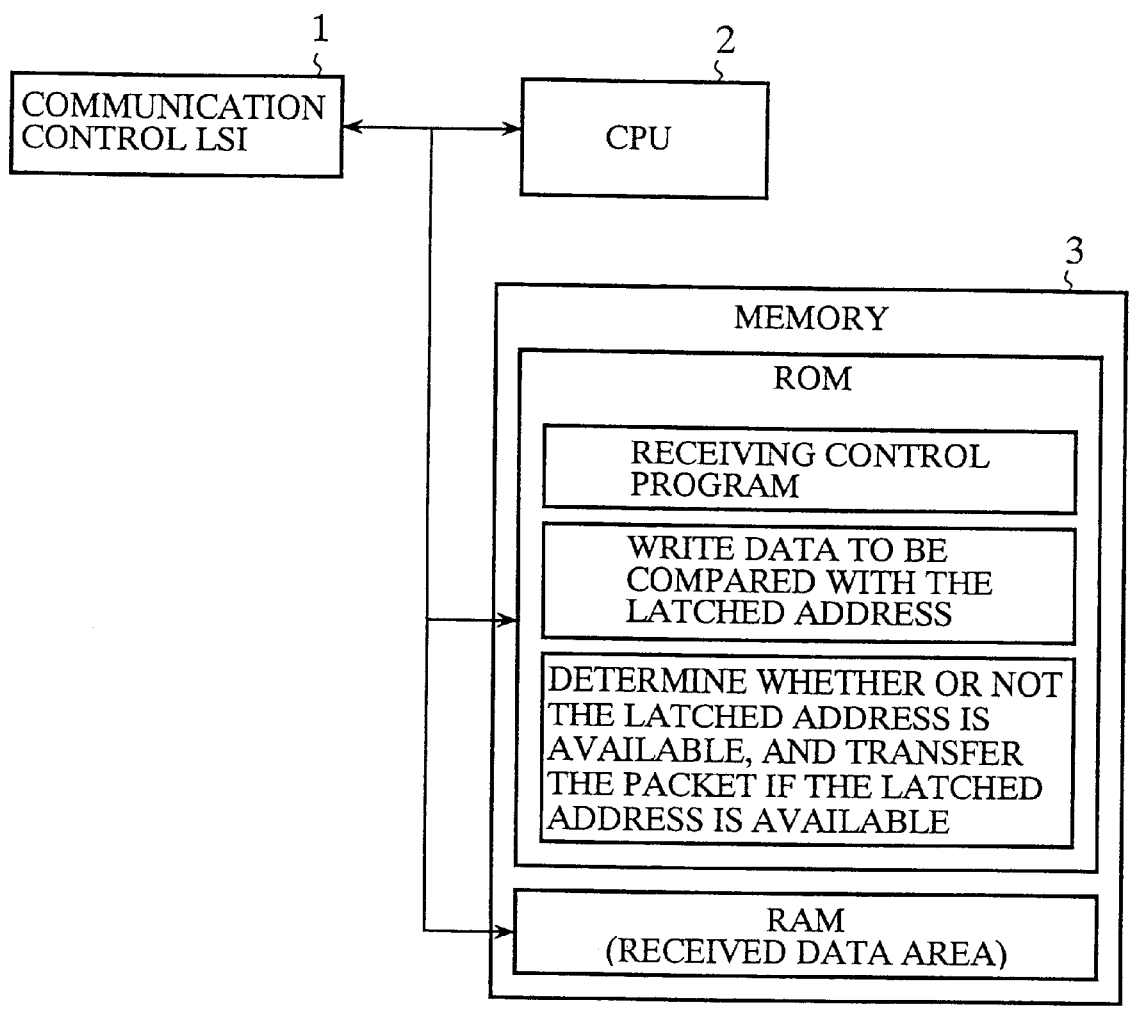
FIG. 31 is a block diagram showing the structure of a prior art communication control system.
Figure 32:
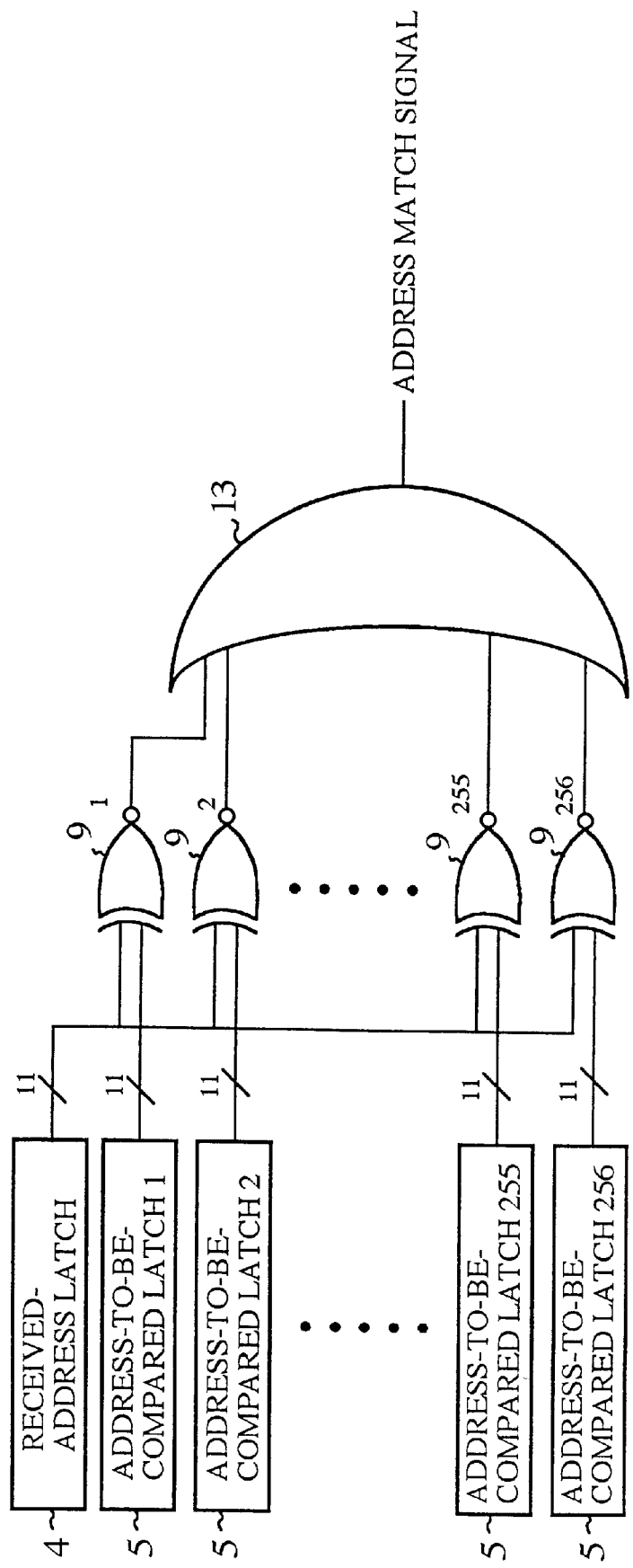
FIG. 32 is a block diagram showing the structure of a communication control LSI of the prior art communication control system of FIG. 31.

It is also clear that the CPU 43 can perform all the address match determination processing when the time interval between packet transfers is relatively long, as shown in FIG. 29. In this case, the memory 42 stores a x coordinate data table in addition to the address filter table. The x coordinate data table includes a plurality of 8-bit x coordinate address data which are in a one-to-one correspondence with 8 possible hex values any of which the x coordinate data Xn of an address code latched can have. Only one bit of each 8-bit x coordinate address data associated with a corresponding hex value is a 1, like the 8-bit decoded x coordinate data furnished by the decoder 51 of the address match determining device of the eighth embodiment. As shown in FIG. 29, the CPU 43 reads the lowest three bits of the latched address and generates the x coordinate data Xn of the latched address, in steps ST81 and ST82. The CPU then, in step ST 83, refers to the x coordinate data table and generates an 8-bit x coordinate address data whose only one bit corresponding to the x coordinate data Xn is a 1. After, the CPU 43 advances to steps ST84 and ST 85 wherein it reads the highest eight bits of the latched address and generates the y coordinate data Ym of the latched address. The CPU then, in step ST86, refers to the address filter table and retrieves a row of eight 1-bit address match determination data D0 to D7 each indicating whether or not a corresponding address code is available, which is indexed by the y coordinate data Ym of the latched address code. Next, the CPU 43 calculates the logical product of the row of eight 1-bit address match determination data D0 to D7 and the 8-bit x coordinate address data, and determines whether or not the logical product is 00 in hex. If the logical product is other than 00 in hex, the CPU 43 transfers the packet stored in the memory 42 to the second communication control LSI 62, in step ST88.

FIG. 30 shows a program list of an example of the software program executed by the CPU 43 for performing the address match determination processing as shown in FIG. 29. The amount of storage required can be reduced compared with that required by the prior art software program as shown in FIG. 34.

To be more specific, when determining whether an address latched matches with each of 256 different available addresses, the prior art method needs about 2 K-bytes of storage for the software program. In contrast, the variant only needs about 30 bytes of storage for the software program and about 264 bytes of storage for x and y coordinate data tables, as shown in FIG. 30.

In the prior art method, the time required for determining whether an address latched matches with each of 256 different available addresses is about 12 to 270 cycles, as shown in FIG. 34. In contrast, the same address comparison processing is carried out in about 50 cycles in the variant as shown in FIGS. 29 and 30. Accordingly, the variant offers an up to about $(1-50/270) \times 100 = 80$ percent improvement in the speed with which the CPU can perform the address match determination processing.

Furthermore, in the prior art method, since the number of addresses to be compared with an address latched is proportional to the amount of storage required and is inversely proportional to the speed with which the CPU can perform the address comparison processing, it is not easy to increase the number of available addresses. In contrast, the amount of storage required by the address match determination method of the present invention is relatively small compared with that required by the prior art method. Accordingly, the address match determination method of the present invention can determine whether an address latched matches with each of all possible addresses. In other words, in the aforementioned examples, the address match determination method of the present invention offers an eight (or 2048/256)-fold improvement in the number of addresses to be compared with an address latched.

Many widely different embodiments of the present invention may be constructed without departing from the spirit and scope of the present invention. It should be understood that the present invention is not limited to the specific embodiment described in the specification, except as defined in the appended claims.

What is claimed is:

1. An address match determining device comprising:
   storage means for storing a matrix or table having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N−m) bits of the corresponding address code;
   extract means for receiving an N-bit address code included in a packet to be transmitted by way of a transmission line, and for extracting the high-order m bits and remaining low-order (N–m) bits from the address code received; and search and determination means for searching through said table stored in said storage means for one 1-bit address match determination data specified by the first index composed of the extracted high-order m bits and the second index composed of the extracted low-order (N–m) bits, and for determining whether the 1-bit address match determination data searched for indicates that the received address code is available.

2. The address match determining device according to claim 1, wherein said search and determination means includes retrieving means for retrieving a row or column of plural 1-bit address match determination data which is specified by the first index composed of the extracted high-order m bits from the table stored in said storage means, and determination means for determining whether one of the plural 1-bit address match determination data corresponding to the second index composed of the extracted low-order (N–m) bits indicates that the received address code is available.

3. The address match determining device according to claim 1, wherein said search and determination means includes retrieving means for retrieving a row or column of plural 1-bit address match determination data which is specified by the second index composed of the extracted low-order (N–m) bits from the table stored in said storage means, and determination means for determining whether one of the plural 1-bit address match determination data corresponding to the first index composed of the extracted high-order m bits indicates that the received address code is available.

4. A communication control system comprising:

storage means for storing a matrix having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N–m) bits of the corresponding address code;

extract means for receiving an N-bit address code included in a packet to be transmitted by way of a transmission line, and for extracting the high-order m bits and remaining low-order (N–m) bits from the address code received;

search and determination means for searching through said table stored in said storage means for one 1-bit address match determination data specified by the first index composed of the extracted high-order m bits and the second index composed of the extracted low-order (N–m) bits, and for determining whether the 1-bit address match determination data searched for indicates that the received address code is available; and transfer means for transferring said packet by way of the transmission line if said search and determination means determines that the received address code is available.

5. The communication control system according to claim 4, wherein said search and determination means includes retrieving means for retrieving a row or column of plural 1-bit address match determination data which is specified by the first index composed of the extracted high-order m bits from the table stored in said storage means, and determination means for determining whether one of the plural 1-bit address match determination data corresponding to the second index composed of the extracted low-order (N–m) bits indicates that the received address code is available.

6. The communication control system according to claim 4, wherein said search and determination means includes retrieving means for retrieving a row or column of plural 1-bit address match determination data which is specified by the second index composed of the extracted low-order (N–m) bits from the table stored in said storage means, and determination means for determining whether one of the plural 1-bit address match determination data corresponding to the first index composed of the extracted high-order m bits indicates that the received address code is available.

7. The communication control system according to claim 4, wherein said storage means, said extract means, and said search and determination means are integrated into a communication control LSI.

8. The communication control system according to claim 5, wherein said extract means and said determination means are integrated into a communication control LSI, said retrieving means and said transfer means are implemented by a processing device electrically connected to said communication control LSI, and said storage means is a memory electrically connected to both said communication control LSI and said processing device, and wherein said processing device can access the high-order m bits of the latched address extracted by said extract means, access said memory so as to retrieve the row or column of plural 1-bit address match determination data, inform said determination means of the row or column of plural 1-bit address match determination data, and enable said communication control LSI to transfer the packet if said determination means of said communication control LSI determines that the received address code is available.

9. The communication control system according to claim 6, wherein said extract means and said determination means are integrated into a communication control LSI, said retrieving means and said transfer means are implemented by a processing device electrically connected to said communication control LSI, and said storage means is a memory electrically connected to both said communication control LSI and said processing device, and wherein said processing device can access the low-order (N–m) bits of the latched address extracted by said extract means, access said memory so as to retrieve the row or column of plural 1-bit address match determination data, inform said determination means of the row or column of plural 1-bit address match determination data, and enable said communication control LSI to transfer the packet if said determination means of said communication control LSI determines that the received address code is available.

10. The communication control system according to claim 5, wherein at least said extract means is integrated into a communication control LSI, said search and determination means and said transfer means are implemented by a processing device electrically connected to said communication control LSI, and said storage means is a memory electrically connected to both said communication control LSI and said processing device, and wherein said processing device can access the high-order m bits of the latched address extracted by said extract means, access said memory so as to retrieve the row or column of plural 1-bit address match determination data, determine whether or not the latched address is available on the basis of the row or column of plural 1-bit address match determination data and the low-order (N–m) bits of the latched address, and enable said communication control LSI to transfer the packet if said processing device determines that the received address code is available.

11. The communication control system according to claim 6, wherein at least said extract means is integrated into a communication control LSI, said search and determination means and said transfer means are implemented by a processing device electrically connected to said communication control LSI, and said storage means is a memory electrically connected to both said communication control LSI and said processing device, and wherein said processing device can access the low-order (N−m) bits of the latched address extracted by said extract means, access said memory so as to retrieve the row or column of plural 1-bit address match determination data, determine whether or not the latched address is available on the basis of the row or column of plural 1-bit address match determination data and the high-order m bits of the latched address extracted by said extract means, and enable said communication control LSI to transfer the packet if said processing device determines that the received address code is available.

12. The communication control system according to claim 4, wherein said storage means, said extract means, and said search and determination means are incorporated into an address match determining device, and at least two communication control LSIs are electrically connected to said address match determining device by way of a data bus, and wherein said address match determining device can receive the address code within a packet to be transferred from one of the communication control LSIs to the other one by way of the data bus, and said transfer means can transfer the packet to the other communication control LSI by way of the data bus if said search and determination means of said address match determining device determines that the latched address is available.

13. The communication control system according to claim 5, wherein said extract means and said determination means are incorporated into an address match determining device, at least two communication control LSIs are electrically connected to said address match determining device by way of a data bus, said retrieving means and said transfer means are implemented by a processing device electrically connected to said two communication control LSIs by way of the data bus, and said storage means is a memory electrically connected to both said communication control LSIs and said processing device by way of the data bus, and wherein said processing device can latch an address code within a packet to be transferred from one of the two communication control LSIs to the other one and inform said address match determining device of the latched address, access the high-order m bits of the latched address extracted by said extract means of said address match determining device, access said memory so as to retrieve the row or column of plural 1-bit address match determination data, inform said determination means of said address match determining device of the row or column of plural 1-bit address match determination data, and transfer the packet to the other communication control LSI if said determination means of said address match determining device determines that the latched address is available.

14. The communication control system according to claim 6, wherein said extract means and said determination means are incorporated into an address match determining device, at least two communication control LSIs are electrically connected to said address match determining device by way of a data bus, said retrieving means and said transfer means are implemented by a processing device electrically connected to said two communication control LSIs by way of the data bus, and said storage means is a memory electrically connected to both said communication control LSIs and said processing device by way of the data bus, and wherein said processing device can latch an address code within a packet to be transferred from one of the two communication control LSIs to the other one and inform said address match determining device of the latched address, access the low-order (N−m) bits of the latched address extracted by said extract means of said address match determining device, access said memory so as to retrieve the row or column of plural 1-bit address match determination data, inform said determination means of said address match determining device of the row or column of plural 1-bit address match determination data, and transfer the packet to the other communication control LSI if said determination means of said address match determining device determines that the latched address is available.

15. The communication control system according to claim 5, wherein at least said extract means is incorporated into an address match determining device, at least two communication control LSIs are electrically connected to said address match determining device by way of a data bus, said search and determination means and said transfer means are implemented by a processing device electrically connected to said two communication control LSIs by way of the data bus, and said storage means is a memory electrically connected to both said communication control LSIs and said processing device by way of the data bus, and wherein said processing device can latch an address code within a packet to be transferred from one of the two communication control LSIs to the other one and inform said address match determining device of the latched address, access the high-order m bits of the latched address extracted by said extract means of said address match determining device, access said memory so as to retrieve the row or column of plural 1-bit address match determination data, determine whether or not the latched address is available on the basis of the row or column of plural 1-bit address match determination data and the low-order (N−m) bits of the latched address, and transfer the packet to the other communication control LSI if said processing device determines that the latched address is available.

16. The communication control system according to claim 6, wherein at least said extract means is incorporated into an address match determining device, at least two communication control LSIs are electrically connected to said address match determining device by way of a data bus, said search and determination means and said transfer means are implemented by a processing device electrically connected to said two communication control LSIs by way of the data bus, and said storage means is a memory electrically connected to both said communication control LSIs and said processing device by way of the data bus, and wherein said processing device can latch an address code within a packet to be transferred from one of the two communication control LSIs to the other one and inform said address match determining device of the latched address, access the low-order (N−m) bits of the latched address extracted by said extract means of said address match determining device, access said memory so as to retrieve the row or column of plural 1-bit address match determination data, determine whether or not the latched address is available on the basis of the row or column of plural 1-bit address match determination data and the high-order m bits of the latched address, and transfer the packet to the other communication control LSI if said processing device determines that the latched address is available.

17. A method of determining whether or not an address latched is available, comprising the steps of:

providing a matrix or table having a plurality of elements each of which is a 1-bit address match determination data indicating whether or not a corresponding N-bit address code is available, and is distinguished by a pair of a first index composed of the m most significant or high-order m bits of the corresponding address code and a second index composed of the remaining lowest or low-order (N–m) bits of the corresponding address code;

receiving an N-bit address code included in a packet to be transmitted by way of a transmission line, and extracting the high-order m bits and remaining low-order (N–m) bits from the address code received;

searching through said table stored in said storage means for one 1-bit address match determination data specified by the first index composed of the extracted high-order m bits and the second index composed of the extracted low-order (N–m) bits; and determining whether or not the latched address is available on the basis of the 1-bit address match determination data searched for.

18. The method according to claim 17, wherein in said searching step, a row or column of plural 1-bit address match determination data which is specified by the first index composed of the extracted high-order m bits is retrieved from the table stored in said storage means, and wherein, in said determination step, it is determined whether one of the plural 1-bit address match determination data corresponding to the second index composed of the extracted low-order (N–m) bits indicates that the received address code is available.

19. The method according to claim 17, wherein in said searching step, a row or column of plural 1-bit address match determination data which is specified by the second index composed of the extracted low-order (N–m) bits is retrieved from the table stored in said storage means, and wherein, in said determination step, it is determined whether one of the plural 1-bit address match determination data corresponding to the first index composed of the extracted high-order m bits indicates that the received address code is available.

* * * * *

UNITED STATES PATENT AND TRADEMARK OFFICE
CERTIFICATE OF CORRECTION

PATENT NO. : 6,314,099 B1 Page 1 of 1
DATED : November 6, 2001
INVENTOR(S) : Yukio Fujisawa et al.

It is certified that error appears in the above-identified patent and that said Letters Patent is hereby corrected as shown below:

<u>Title page,</u>
Item [73], the following three assignees are added:
-- [73]   Mitsubishi Semiconductor Europe, GmbH, Alsdorf (DE)
         Mitsubishi Electric Europe B.V., Amsterdam (NL)
         Mitsubishi Denki Kabushiki Kaisha, Tokyo (JP) --

Signed and Sealed this

Thirteenth Day of August, 2002

*Attest:*

*Attesting Officer*

JAMES E. ROGAN
*Director of the United States Patent and Trademark Office*